(12) United States Patent
Chebiyyam et al.

(10) Patent No.: US 11,914,390 B2
(45) Date of Patent: Feb. 27, 2024

(54) DISTINGUISHING BETWEEN DIRECT SOUNDS AND REFLECTED SOUNDS IN AN ENVIRONMENT

(71) Applicant: Zoox, Inc., Foster City, CA (US)

(72) Inventors: Venkata Subrahmanyam Chandra Sekhar Chebiyyam, San Francisco, CA (US); Aleksandr Oysgelt, Palo Alto, CA (US); Subasingha Shaminda Subasingha, San Ramon, CA (US); Nam Gook Cho, Cupertino, CA (US)

(73) Assignee: ZOOX, INC., Foster City, CA (US)

( * ) Notice: Subject to any disclaimer, the term of this patent is extended or adjusted under 35 U.S.C. 154(b) by 710 days.

(21) Appl. No.: 16/836,605

(22) Filed: Mar. 31, 2020

(65) Prior Publication Data

US 2021/0302987 A1    Sep. 30, 2021

(51) Int. Cl.
*G05D 1/00* (2006.01)
*G01S 17/931* (2020.01)
*G01S 17/89* (2020.01)
*G08G 1/16* (2006.01)
*G01S 17/86* (2020.01)

(52) U.S. Cl.
CPC .......... *G05D 1/0238* (2013.01); *G01S 17/86* (2020.01); *G01S 17/89* (2013.01); *G01S 17/931* (2020.01); *G08G 1/166* (2013.01); *G05D 2201/0213* (2013.01)

(58) Field of Classification Search
CPC .......... G05D 1/0238; G05D 2201/0213; G01S 17/931; G01S 17/86; G01S 17/89; G08G 1/166
See application file for complete search history.

(56) References Cited

U.S. PATENT DOCUMENTS

| 5,659,520 A | 8/1997 | Watson et al. |
| 8,718,674 B2 | 5/2014 | Germond et al. |
| 9,278,689 B1* | 3/2016 | Delp .................... G10L 25/48 |
| 10,149,048 B1 | 12/2018 | Stefanakis et al. |
| 2011/0175755 A1* | 7/2011 | Yoshioka ............... G08G 1/167 |
| | | 340/988 |
| 2012/0207323 A1 | 8/2012 | Kim |

(Continued)

OTHER PUBLICATIONS

Office Action for U.S. Appl. No. 16/836,632, dated Jun. 8, 2022, Chebiyyam, "Detecting Occluded Objects Using Sound", 22 pages.

(Continued)

*Primary Examiner* — Truc M Do
(74) *Attorney, Agent, or Firm* — Lee & Hayes P.C.

(57) ABSTRACT

Techniques for determining information associated with sounds detected in an environment based on audio data and map data or perception data are discussed herein. A vehicle can use map data and/or perception data to distinguish between multiple audio signals or sounds. A direct source of sound can be distinguished from a reflected source of sound by determining a direction of arrival of sounds and which objects the directions of arrival are associated with in the environment. A reflected sound can be received without receiving a direct sound. Based on the reflected sound and map data or perception data, characteristics of sound in an occluded region of the environment may be determined and used to control the vehicle.

20 Claims, 8 Drawing Sheets

(56) References Cited

U.S. PATENT DOCUMENTS

| | | | |
|---|---|---|---|
| 2013/0010980 A1* | 1/2013 | Yoshioka | G01S 3/808 |
| | | | 381/92 |
| 2018/0053413 A1* | 2/2018 | Patil | G01S 11/14 |
| 2018/0211528 A1 | 7/2018 | Seifert | |
| 2018/0255395 A1* | 9/2018 | Kanamori | G10L 25/84 |
| 2018/0374347 A1* | 12/2018 | Silver | G08G 1/0965 |
| 2019/0120926 A1 | 4/2019 | Ge et al. | |
| 2019/0294169 A1 | 9/2019 | Shabtai et al. | |
| 2019/0356999 A1* | 11/2019 | Raghuvanshi | H04S 7/304 |
| 2020/0213728 A1 | 7/2020 | Lopatka et al. | |
| 2020/0234579 A1 | 7/2020 | Silver et al. | |
| 2021/0302988 A1 | 9/2021 | Chebiyyam et al. | |

OTHER PUBLICATIONS

Cheng, et al., "OKCARS: Oklahoma Collision Analysis and Response System", OKTC, Economic Enhancement Through Infrastricture Stewardship, School of Electrical and Computer Engineering, Oklahoma State University, Oct. 31, 2012, 106 pages.

The PCT Search Report and Written Opinion dated Jul. 1, 2021 for PCT Application No. PCT/US2021/024584, 9 pages.

* cited by examiner

DISTINGUISHING BETWEEN DIRECT SOUNDS AND REFLECTED SOUNDS IN AN ENVIRONMENT

BACKGROUND

Vehicles often encounter emergency vehicles in an environment. During an emergency, the emergency vehicle may drive rapidly and may use lights and/or sirens to announce its presence. As the emergency vehicle has a higher priority in driving, non-emergency vehicles should yield to the emergency vehicle. In the context of an autonomous vehicle, it may be important for the autonomous vehicle to have a scheme to detect the emergency vehicle and respond to an occurrence of the emergency vehicle in its environment, especially in complex environments that can make such detections challenging.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
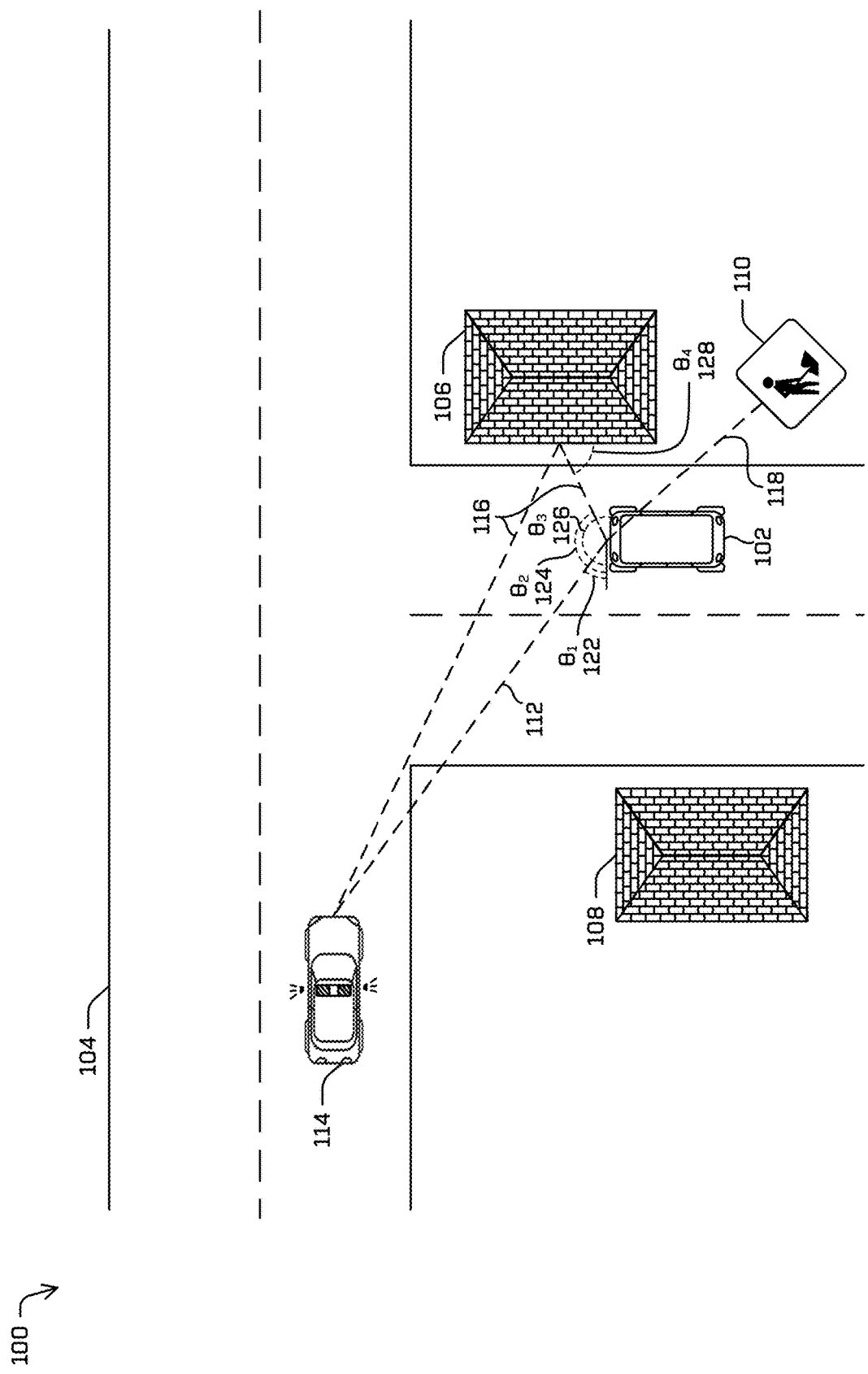
FIG. 1 is a pictorial diagram illustrating an example implementation to disambiguate between direct and reflected sounds, as well as other noises in an environment, in accordance with examples of the disclosure.

Techniques for determining information associated with sounds detected in an environment of a vehicle based on audio data and map data or perception data are discussed herein. The vehicle may be an autonomous vehicle including audio sensors to determine audio data based on sounds from the environment. In some examples, sounds may be caused by objects in the environment such as emergency vehicles, construction zones, non-emergency vehicles, humans, audio speakers, nature, etc. After audio data is captured, a computing device of the vehicle may analyze the audio data to determine a direction of arrival (DoA) associated with the sound. In some complex environments, it may be difficult to distinguish between a direct sound (also referred to as a direct audio signal), a reflected sound (also referred to as a reflected audio signal), and/or other objects that may less relevant to the motion of the vehicle. In some examples, the vehicle may analyze supplemental data associated with the environment to distinguish between multiple audio signals and/or types of sounds. In some examples, the supplemental data may include map data and/or perception data such as image data, lidar data, or radar data captured by one or more sensors associated with the vehicle and/or data derived therefrom such as, but not limited to, detections, segmentations, classifications, etc. Further, techniques can include receiving reflected sound without receiving direct sound (e.g., if a source of sound is hidden or occluded). Based on the reflected sound and map data and/or perception data, the vehicle can determine characteristics of sound whereby a source of the sound may be in an occluded region of the environment.

Audio sensors of a vehicle may capture sound and determine audio data based on the sound, which may be transmitted to a computing device either implemented on the vehicle or remotely on a server. The computing device may determine characteristics of the audio data associated with objects in the environment. In some examples, characteristics that are determined may include an angular spectrum and/or an amplitude associated with the audio data, or a direction of arrival (DoA) value associated with the audio data.

In some examples, a vehicle may receive audio data captured via audio sensors (e.g., pairs of audio sensors) of the vehicle. The audio data may be received from the audio sensors as signals associated with objects (e.g., original sources of sounds and/or objects from which sound is reflected). For example, first audio data may be captured via sensors as first sound associated with a first object, second audio data may be captured via sensors as second sound associated with a second object, and third audio data may be captured via sensors as third sound associated with a third object, and so on. The first object, the second object, and the third object may each be a different object from one another, or a same object as one or more of the other objects (e.g., the first object may be ultimately a same object as the second object, and a different object from the third object). In some examples, the first audio data may be captured via a first pair of audio sensors as first sound associated with a first object, the second audio data may be captured via a second pair of audio sensors as second sound associated with a second object, and the third audio data may be captured via a third pair of audio sensors as third sound associated with a third object, and so on.

In some examples, angular spectrums and/or amplitudes may be determined for audio data. DoA values may be determined for audio data based on the angular spectrums and/or the amplitudes. Categories of audio events may be determined for the audio data. In some examples, the categories of the audio events may be determined based on the DoA values and an audio event classifier. For example, the audio event classifier may classify an event as an emergency event or a non-emergency event and may classify the audio event more specifically within each broad class. The audio event classifier may be trained to determine the categories of events. Examples of an audio event classifier are provided in U.S. patent application Ser. No. 16/661,898, titled "Emergency Vehicle Detection," filed Oct. 23, 2019, the entirety of which is herein incorporated by reference.

In some examples, a direction of a source of sound may be determined from direct sound received from the object. In some cases, the vehicle may capture audio data from two or more different directions, which may indicate at least two objects in an environment. However, supplemental data associated with an environment of a vehicle may be analyzed to determine if the two or more sounds correspond to the same object or if the sounds correspond to multiple, different objects. The supplemental data may include map data and/or perception data. The map data may include 2D information, and/or a mesh or other source of 3D information of an environment. The map data and/or perception data may be analyzed to determine the direction of the emergency vehicle associated with the emergency event based on DoA values associated with audio data. In one example, a computing device may determine that first audio data associated with a first DoA corresponds to a vehicle (e.g., an emergency vehicle) represented in image data. In some examples, the computing device may determine that second audio data associated with a second DoA may correspond to an object such as a building in an environment. In another example, the computing device may determine that second audio data associated with the second DoA may correspond to a construction zone. In either case, a computing device can eliminate or otherwise exclude the second audio data from other determinations about a location associated with an emergency in an environment.

Further, in some cases the techniques can use map data and/or perception data to determine a geometry of an environment, which may be used to determine that multiple sounds correspond to a same object. For example, the computing device can determine an angle of reflection associated with the second DoA (which, in this example, may correspond to a building) and can trace a path of the sound into the environment. If the path of the sound is associated with a location of the object (in this case, an emergency vehicle) associated with the first DoA (or is within some threshold distance or angle of the object), the computing device can determine that the first audio data and the second audio data correspond to the same object.

In some examples, the vehicle may capture audio data representative of sounds in an environment over time to determine additional information about objects associated with such sounds. First audio data may be associated with a first time and second audio data may be associated with a second time after the first time. The first and second audio data may be analyzed to determine DoA values associated with the audio data. Locations of an emergency vehicle at different times may be determined based on the DoA values associated with the audio data. A distance between the locations of the emergency vehicle at the different times may be determined based on geometries associated with an environment of the emergency vehicle at the different times. In some examples, directions of the emergency vehicle at the different times, and/or a velocity of the emergency vehicle, may be determined based on DoA values associated with audio data captured at a time and other DoA values associated with other audio data captured at another time, further based on the geometries. In some examples, tracking and position estimation of the emergency vehicle may be performed based on at least one of the DoA values or the other DoA values. In some examples, a first DoA value determined based on a first audio signal that is a direct audio signal received from an object at a first time may vary uniformly with respect to a second DoA value determined based on a second audio signal that is a direct audio signal received from the object a second time. On the other hand, a third DoA value determined based on a third audio signal that is a reflected audio signal received from an object at the first time may not vary as expected with respect to a fourth DoA value determined based on a fourth audio signal that is a reflected audio signal received from the object the second time. Accordingly, a variability of a DoA value can be used to determine characteristics of a sound, such as whether a source of the sound is occluded with respect to the vehicle.

In some examples, a vehicle may receive audio data via audio sensors (e.g., a pair of audio sensors) as a direct signal (e.g., a sound originating from a source without any reflections—a direct sound) associated with an object (e.g., a source of the sound) or as a reflected signal (e.g., a reflected sound) whereby the sound is generated by the object and reflected off of an object in the environment prior to being captured by audio sensors of the vehicle. In some examples, reflected sound may be received with or without direct sound. In some instances, as when a source of a reflected sound corresponds to an occluded region, the techniques can include determining a presence, location, and/or velocity of the object based on audio generated from occluded object(s) over time.

The techniques discussed herein can improve a functioning of a computing device of a vehicle in a number of ways. As the audio sensors of the vehicle can capture the sound generated by sirens before other sensors, such as image sensors(s), lidar sensor(s), and radar sensor(s), utilizing the audio data can improve a capability of the vehicle to respond to an emergency. For example, in the context of determining a direction of arrival of an emergency vehicle, utilizing various audio sensor pairs to capture the audio data and analyzing the features associated with the angular spectra of the various audio sensor pairs can improve the accuracy and/or reduce a latency for the vehicle to respond to the emergency in the environment. Further, some emergency vehicles, such as undercover vehicles, may not provide visual indications of an emergency. The techniques discussed herein can facilitate the vehicle to respond to the emergency even when an emergency vehicle is occluded and/or in the dark at night.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using audio data. Further, although discussed in the context of emergency vehicle(s) or sounds associated with such emergency vehicle(s), the techniques can be applicable to any type or category of sound and are not limited to specific examples discussed herein. Additionally, the techniques described herein can be used with real data (e.g., captured using sensor(s)), simulated data (e.g., generated by a simulator), or any combination of the two.

FIG. 1 is a pictorial diagram 100 illustrating an example implementation to disambiguate between direct and reflected sounds, as well as other noises in an environment, in accordance with examples of the disclosure.

As illustrated in FIG. 1, a vehicle 102 may receive, via one or more sensors of the vehicle 102, audio data representing sound in an environment where the vehicle 102 is located. The vehicle 102 may travel on one or more roads (e.g., a road intersection 104). For example, the vehicle 102 may travel at the road intersection 104, and on a road aligned vertically with, and intersecting, another road aligned horizontally. The environment may include objects (e.g., a building 106, a building 108, and a construction zone 110) near and/or in an area associated with the vehicle 102.

The vehicle 102 may receive sounds from a variety of sources and can generate, capture, or otherwise determine audio data to be processed. The sounds may be received by the vehicle 102 as audio signals. First audio data associated with sound 112 can be captured by a first pair of audio sensors of the vehicle 102. In some examples, the sound 112 can be associated with a first object (e.g., an emergency vehicle 114). The sound 112 with which the first audio data is associated may be determined as having been received as direct sound (also referred to as a direct audio signal), based on the map data and/or perception data. Second audio data associated with sound 116 can be captured by a second pair of audio sensors of the vehicle 102. As discussed below, the sound 116 represents a sound generated by or associated with the emergency vehicle 114 but has been reflected by a second object (e.g., building 106) in the environment. In some examples, at least one of the second pair of audio sensors may be different from at least one of the first pair of audio sensors. In some examples, both sensors of the second pair of audio sensors may be the same as both sensors of the first pair of audio sensors. Third audio data associated with sound 118 can be captured by a third pair of audio sensors of the vehicle 102. In some examples, the third sound 118 can be associated with a third object (e.g., the construction zone 110). The emergency vehicle 114 may travel at, or near, the road intersection 104, and on the other road aligned horizontally with, and intersecting, the road aligned vertically on which the vehicle 102 travels. As discussed herein, the first, second, and third pair of audio sensors can correspond to the same or different audio sensors associated with the vehicle 102.

A computing device (e.g., an example of vehicle computing device(s) 506 or computing device(s) 624 described below in connection with FIG. 6) may determine angular spectrums and/or amplitudes associated with audio data. In some examples, at least one of an angular spectrum and/or an amplitude associated with the first audio data, an angular spectrum and/or an amplitude associated with the second audio data, or an angular spectrum and/or an amplitude associated with the third audio data may be determined.

The computing device may determine DoA values associated with the audio data. In some examples, a first DoA value 122 (illustrated as $\theta_1$) associated with the first audio data may be determined based on the angular spectrum and/or the amplitude associated with the first audio data. A second DoA value 124 (illustrated as $\theta_2$) associated with the second audio data may be determined based on the angular spectrum and/or the amplitude associated with the second audio data. A third DoA value 126 (illustrated as $\theta_3$) associated with the third audio data may be determined based on the angular spectrum and/or the amplitude associated with the third audio data. Examples of determining the angular spectrum, amplitude, and/or DoA are provided in U.S. patent application Ser. No. 16/661,898, titled "Emergency Vehicle Detection," filed Oct. 23, 2019, the entirety of which is herein incorporated by reference.

The computing device may include audio event classifier. A first category of a first audio event associated with the first audio data may be classified based on the first DoA value 122 and the audio event classifier. A second category of a second audio event associated with the second audio data may be classified based on the second DoA value 124 and the audio event classifier. A third category of a third audio event associated with the third audio data may be classified based on the third DoA value 126 and the audio event classifier. For example, each of the first category and the second category may be classified as an emergency event, and the third audio event may be classified as a non-emergency event.

The computing device may receive supplemental data (also referred to as "environment data" or "environmental data") associated with the environment of the vehicle 102. The supplemental data may be analyzed along with the audio data and/or DoA to determine additional information about objects in the environment, such as the emergency vehicle 114. The supplemental data may include map data and/or perception data (e.g., image data, lidar data, radar data, etc. and/or data derived therefrom). The map data and/or perception data may be analyzed to determine the location, velocity, classification, and the like of the emergency vehicle 114 based on the first DoA value 122, the second DoA value 124, and/or the third DoA value 126. The computing device may include an objects classifier to determine a first category of the emergency vehicle 114, a second category of the building 106, and a third category of the construction zone 110. In some examples, the corresponding category of each object may be determined based on the map data and/or the perception data. For example, the objects classifier may classify the emergency vehicle 114 as an emergency object, the building 106 as a non-emergency object, and the construction zone 110 as a non-emergency object.

A location of the emergency vehicle 114, a location of the building 106, and a location of the construction zone 110 may be determined. At least one of the first audio data, the second audio data, or the third audio data may be eliminated as audio data associated with the emergency vehicle 114 based on the location of the emergency vehicle 114, the location of the building 106, and the location of the construction zone 110. For example, the second DoA value 124 and the third DoA value 126 may be analyzed based on the building 106 and the construction zone 110 being classified as non-emergency objects. The second audio data with which the second DoA value 124 is associated may be eliminated based on the second DoA value 124 being associated with the location of the building 106 that is classified as a non-emergency object. The third audio data with which the third DoA value 126 is associated may be eliminated based on the third DoA value 126 being associated with the location of the construction zone 110 that is classified as of a non-emergency object.

The sound 116 with which the second audio data is associated may be determined as having been received as reflected sound (also referred to as a reflected audio signal), based on the map data and/or perception data. For example, the sound 116 may be determined as having been generated by the emergency vehicle 114 and reflected by the building 106 to be received as a reflected audio signal. The computing device may determine an angle of reflection 128 of the reflected audio signal associated with the second audio data. The angle of reflection 128 may be determined based on the third DoA value 126, map data and/or the perception data. The direction of the emergency vehicle 114 may be determined based on the second audio data and the third audio data being eliminated, and further based on the perception data, to determine that the first DoA value 122 is associated with the location of the emergency vehicle 114. The location of the emergency vehicle 114 may be determined based on the map data and/or the perception data, and/or at least one of the first DoA value 122, the second DoA value 124, the third DoA value 126, and/or the angle of reflection 128.

In some examples, a cross correlation (e.g., a normalized cross correlation) may be performed to determine threshold value(s) indicating whether audio data(s) are the same or different audio signal(s). The normalized cross correlation may be used to generate a scattering model based on scattering of audio signal(s). The scattering model is more complex than a simple geometry model and may be used to determine the threshold value(s). The normalized cross correlation may be performed based on dispersion of overlapping audio signals as a result of a reflected audio signal not being a perfect reflection of the audio signal that is emitted and then subsequently reflected. A dispersed pulse (e.g., wider pulse) resulting from scattering from the reflected audio signal being reflected will be detected instead of one sharp impulse. The scattering model may be used to determine the location of the source of the sound by undoing scattering effects of the reflected audio signal and localizing a direction of the sound that is received as the reflected audio signal.

In some examples, a normalized cross correlation may be performed to determine a threshold value indicating that the second audio data with which the second DoA value 124 is associated is different audio data from the first audio data with which the first DoA value 122 is associated. The normalized cross correlation may be used to generate a scattering model based on scattering of the reflected audio signal by which the sound 116 is received. The scattering of the reflected audio signal by which the sound 116 is received may be a result of the reflected audio signal being reflected off of the building 106. A dispersed pulse may be received by the vehicle 102 instead of one sharp impulse. The dispersed pulse may be received as the reflected audio signal by a pair of sensors of the vehicle 102, or by more than two sensors of the vehicle 102.

In some examples, a scattering model may be generated based on wavelength scattering by the vehicle 102 and used to estimate the location of the source of the sound. One or both of the scattering model generated based on the scattering of the reflected audio signal and the scattering model generated based on the scattering by the vehicle 102 may be used to estimate the location.

Figure 2:
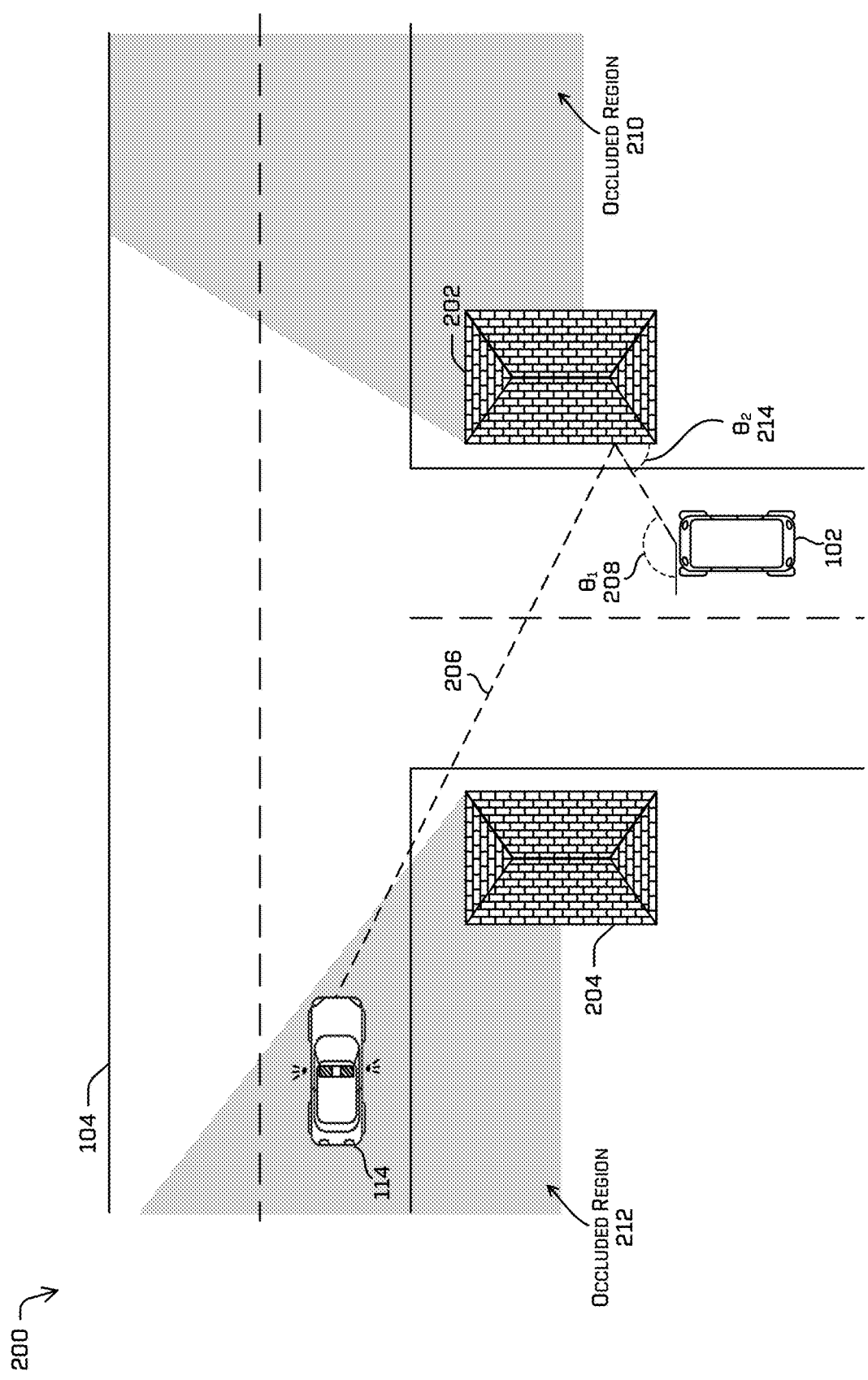
FIG. 2 is a pictorial diagram illustrating an example implementation to determine characteristics of sound originating from an occluded region, in accordance with examples of the disclosure.

FIG. 2 is a pictorial diagram 200 illustrating an example implementation to determine characteristics of sound originating from an occluded region, in accordance with examples of the disclosure.

As illustrated in FIG. 2, a vehicle 102 may receive, via one or more sensors of the vehicle 102, audio data representing sound in an environment where the vehicle 102 is located. The vehicle 102 may travel on one or more roads (e.g., a road intersection 104). For example, the vehicle 102 may travel at the road intersection 104, and on a road aligned vertically with, and intersecting, another road aligned horizontally. The environment may include objects that are stationary (e.g., a building 202 and a building 204) near and/or in an area associated with the vehicle 102. A location of the building 204, for example, may different from a location of the building 108, and may be in a line of sight between the vehicle 102 and the emergency vehicle 114. For example, the location of the building 204 may prevent the emergency vehicle 114 from being visible by sensors of the vehicle 102. A. The environment may include an object that moves (e.g., an emergency vehicle 114).

The vehicle 102 may receive sound from a variety of sources and can generate, capture, or otherwise determine audio data to be processed. Audio data associated with sound 206 can be captured by a pair of audio sensors of the vehicle 102. As discussed below, the sound 206 represents a sound generated by or associated with a first object (e.g., emergency vehicle 114) but has been reflected by a second object (e.g., building 202) in the environment. The emergency vehicle 114 may travel at, or near, the road intersection 104, and on the other road aligned horizontally with, and intersecting, the road aligned vertically on which the vehicle 102 travels.

A computing device (e.g., an example of vehicle computing device(s) 506 or computing device(s) 624 described below in connection with FIG. 6) may determine at least one of an angular spectrum and/or an amplitude associated with the audio data. A DoA value 208 associated with the audio data may be determined based on the angular spectrum and/or the amplitude associated with the audio data.

The computing device may include audio event classifier. A category of an audio event associated with the audio data may be classified based on the DoA value 208 and the audio event classifier. For example, the category of the audio event associated with the emergency vehicle 114 as an emergency event may be classified as an emergency event.

The computing device may receive supplemental data associated with the environment of the vehicle 102. The supplemental data may include map data and/or perception data. The map data and/or the perception data may be analyzed to determine locations of the building 202 and the building 204 in the environment of the vehicle. The computing device may include an objects classifier. The objects classifier may be implemented together with the audio event classifier as a single classifier or implemented separately from the audio event classifier as a different classifier. The objects classifier may classify the emergency vehicle 114 as an emergency object. The objects classifier may classify the building 202 and the building 204 as non-emergency objects and may identify the building 202 and the building 204 more specifically as buildings.

The computing device may determine that the sound 206 received by the vehicle 102 is a reflected sound based on the map data and/or perception data. For example, the sound 206 may be classified as being associated with an emergency siren. Further, the DoA 208 can be traced to the building 202 (as may be indicated in either one or more of the map or perception data). The computing device may determine an angle of reflection 214 of the sound 206 based on map data and/or perception data and the DoA 208. In some examples, the computing device can determine that the sound 206 is a reflected sound based on a location of the reflected sound originating from a drivable region. The angle of reflection 214 may be determined based on the map data and/or the perception data. For example, map data, image data, and or lidar data can be used to determine an orientation of a surface of the building 202 and can determine the angle of reflection 214 based on the DoA. The location of the emergency vehicle 114 may be determined (e.g., assumed or otherwise estimated) by inferring a motion of the emergency vehicle based on a relative motion of the emergency vehicle, and further based on the map data, the perception data, and/or the DoA value 208, and further based on the angle of reflection 214 over time.

The map data and/or the perception data may be analyzed to further determine locations of objects in occluded regions (e.g., an occluded region 210 and an occluded region 212) in the environment. The occluded region 210 and the occluded region 212 may be identified based on the locations of the building 202 and the building 204 and a location of the vehicle 102. For example, the occluded region 210 may be determined based on a location of the first building 202 and a location of the vehicle 102. The occluded region 212 may be determined based on a location of the building 204 and the location of the vehicle 102. In some examples, map data can be used to determine whether one or more occluded region(s) are associated with a drivable region (e.g., a road) or a non-drivable region (e.g., a building or park). Characteristics of one or more occluded region(s) can be used in classifying an object and/or determining probable velocities, locations, directions of travel of an object, determining a probability that the emergency vehicle may come from an occluded region, and the like. As a non-limiting example, map data may be used to confirm that there is (or is not) a drivable surface along the direction of the reflected portion in the occluded region, thereby increasing (or decreasing) a probability of the audio signal originating from within the occluded region. Examples of determining occluded region(s) are provided in U.S. patent application Ser. No. 16/011,436, titled "Occlusion Aware Planning," filed Jun. 18, 2018, the entirety of which is herein incorporated by reference.

The computing device may determine a location of the emergency vehicle 114 based on the map data and/or the perception data. The location of the emergency vehicle 114 may be determined to correspond to the occluded region 212, based on the sound based on the DoA associated with audio data, based on map data to determine an angle of reflection, and based on map data to further trace the sound to an occluded region.

Figure 3:
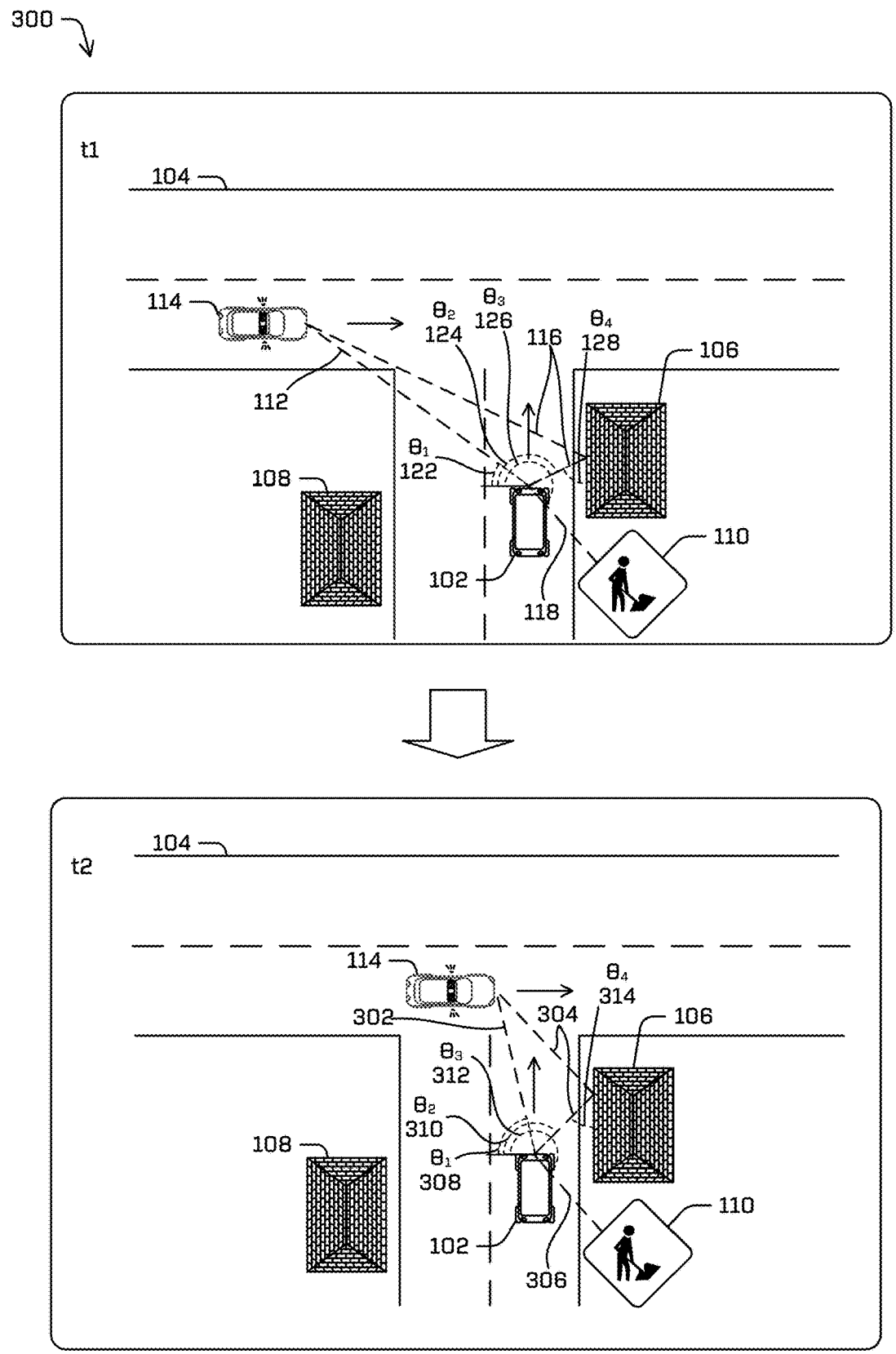
FIG. 3 is a pictorial diagram illustrating an example implementation to disambiguate between sounds over time, in accordance with examples of the disclosure.

FIG. 3 is a pictorial diagram 300 illustrating an example implementation to disambiguate between sounds over time, in accordance with examples of the disclosure.

As illustrated in FIG. 3, a vehicle 102 may receive sounds from a variety of sources at different times (e.g., times $t_1$ and $t_2$), and can generate, capture, or otherwise determine audio data to be processed. At the time $t_1$, the emergency vehicle 114 is at the location as described above in connection with FIG. 1. The vehicle 102 may receive the sounds 112, 116, and 118. The computing device may determine a geometry associated with the environment at the time $t_1$. The geometry associated with the environment at the time $t_1$ may be determined based on geometry data determined based on map data and/or perception data. The geometry data may include at least one of the first DoA value 122 associated with the sound 112, the second DoA value 124 associated with the sound 116, the third DoA value 126 associated with the third sound 118, or the angle of reflection 128. The location of the emergency vehicle 114 at the time $t_1$ may be determined based on the geometry associated with the environment at the time $t_1$.

At the time $t_2$ (which may correspond to a time after $t_1$), a location of the emergency vehicle 114 may be different in comparison to the location of the emergency vehicle 114 at the time $t_1$ (e.g., the emergency vehicle 114 may be closer to a center of the road intersection 104). The vehicle 102 may receive sounds 302, 304, and 306 at the time $t_2$. The vehicle 102 may capture fourth audio data associated with the sound 302, fifth audio data associated with the sound 304, and sixth audio data associated with the sound 306. The fourth audio data associated with the sound 302 can be captured by a fourth pair of audio sensors of the vehicle 102. In some examples, the sound 302 can be associated with the emergency vehicle 114. The fifth audio data associated with the sound 304 can be captured by a fifth pair of audio sensors of the vehicle 102. As discussed below, the sound 304 represents a sound generated by or associated with the vehicle 114 but has been reflected by the building 106. The sixth audio data associated with the sound 306 can be captured by a sixth pair of audio sensors of the vehicle 102. In some examples, the sixth sound 306 can be associated with the construction zone 110. The pairs of audio sensors by which the vehicle 102 receives the sounds 302, 304, and 306 can correspond to the same or different audio sensors used to receive the sounds 112, 116, and 118.

The computing device may determine a at least one of an angular spectrum and/or an amplitude associated with the fourth audio data, an angular spectrum and/or an amplitude associated with the fifth audio data, or an angular spectrum and/or an amplitude associated with the sixth audio data. A fourth DoA value 308 associated with the fourth audio data may be determined based on the angular spectrum and/or the amplitude associated with the fourth audio data. A fifth DoA value 310 associated with the fifth audio data may be determined based on the angular spectrum and/or the amplitude associated with the fifth audio data. A sixth DoA value 312 associated with the sixth audio data may be determined based on the angular spectrum and/or the amplitude associated with the sixth audio data.

The computing device may classify categories of events based on DoA values, the audio event classifier, and map data and/or perception data. A fourth category of a fourth audio event associated with the fourth audio data may be classified based on the fourth DoA value 308 and the audio event classifier. A fifth category of a fifth audio event associated with the fifth audio data may be classified based on the fifth DoA value 310 and the audio event classifier. A sixth category of a sixth audio event associated with the sixth audio data may be classified based on the sixth DoA value 312 and the audio event classifier. For example, each of the fourth category and the fifth category may be classified as an emergency event, and the sixth audio event may be classified as a non-emergency event.

The computing device may analyze the supplemental data to determine a direction of the emergency vehicle 114 at the time $t_2$. The map data and/or perception data may be analyzed to determine the direction of the emergency vehicle 114 based on the fourth DoA value, the fifth DoA value, and the sixth DoA value.

The sound 304 with which the second audio data is associated may be determined as having been received as a reflected audio signal, based on the map data and/or perception data. For example, the sound 304 may be determined as having been transmitted by the emergency vehicle 114 as an audio signal and reflected by the building 106 as the reflected audio signal associated with the audio signal transmitted by the emergency vehicle 114. The computing device may determine an angle of reflection 314 of the reflected audio signal associated with the second audio data. The angle of reflection 314 may be determined based on the map data and/or the perception data. The second audio data and the third audio data may be eliminated as being associated with the location of the emergency vehicle 114 at the time $t_2$, based on the map data and/or the perception data, and/or at least one of the fourth DoA value 308, the fifth DoA value 310, the sixth DoA value 312, and/or the angle of reflection 314. The direction of the emergency vehicle 114 at the time $t_2$ may be determined based on the fourth DoA value 308 being associated with the location of the emergency vehicle 114.

Audio data associated with sounds received at the time $t_1$ may be compared to audio data associated with sounds received at the time $t_2$. For example, the first audio data associated with the vehicle 114, the second audio data associated with the sound 116, and the third audio data associated with the sound 118 may be compared to the fourth audio data associated with the sound 302, the fifth audio data associated with the sound 304, and the sixth audio data associated with the sound 306.

The location of the emergency vehicle 114 at the time $t_1$ may be compared to the location of the emergency vehicle 114 at the time $t_2$. For example, the first DoA 122, the second DoA 124, the third DoA 126, and/or the angle of reflection 128 used to determine the location of the emergency vehicle 114 at the time $t_1$ may be compared to the fourth DoA 308, the fifth DoA 310, the sixth DoA 312, and/or the angle of reflection 314 used to determine the location of the emergency vehicle 114 at the time $t_2$.

The computing device may determine a geometry associated with the environment at the time $t_2$. The geometry associated with the environment at the time $t_2$ may be determined based on geometry data, the geometry data including at least one of the first DoA value 308 associated with the sound 302, the second DoA value 310 associated with the sound 304, or the third DoA 312 associated with the sound 306, or the angle of reflection 314. T. The location of the emergency vehicle 114 at the time $t_2$ may be determined based on the geometry associated with the environment at the time $t_2$. A distance between the location of the emergency vehicle 114 at the time $t_1$ and the location of the emergency vehicle 114 at the time $t_2$ may be determined based on the geometry associated with the environment at the time $t_1$ and the geometry associated with the environment at the time $t_2$. A time difference between the time $t_1$ and the time $t_2$ may be determined by subtracting the time $t_1$ from the time $t_2$. In some examples, determining the distance between the location of the emergency vehicle 114 at the time $t_1$ and the location of the emergency vehicle 114 at the time $t_2$ may include at least one of determining an existence of the emergency vehicle 114 at the times $t_1$ and $t_2$, determining an approximate location of the emergency vehicle 114 at each of the times $t_1$ and $t_2$, or determining an approximate velocity of the emergency vehicle 114. In some examples, determining the distance includes determining at least bounds on a velocity of the emergency vehicle 114 based on the existence of the emergency vehicle 114 being determining at the times $t_1$ and $t_2$. The vehicle 102 may be controlled based on the existence of the emergency vehicle 114 that is determined at the times $t_1$ and $t_2$, as well as the approximate velocity of the vehicle 102. In some examples, the vehicle 102 may be controlled based on the emergency vehicle 114 being determined to be travelling toward, or away from, the vehicle 102, or based on the emergency vehicle 114 being determined to be on the same road, or a different road, as the vehicle 102.

The computing device may determine a velocity of the emergency vehicle 114 based on the distance between the location of the emergency vehicle 114 at the time $t_1$ and the second location of the location of the emergency vehicle 114 at the time $t_2$, and further based on the time difference between the time $t_1$ and the time $t_2$. For example, the velocity of the emergency vehicle 114 may be determined based by dividing the distance between the location of the emergency vehicle 114 at the time Land the second location of the location of the emergency vehicle 114 at the time $t_2$, by the time difference between the time $t_1$ and the time $t_2$.

That is, techniques discussed herein can be used to determine a velocity of an object and/or to confirm observations of other sensor modalities. For example, a perception system may determine a first velocity associated with the vehicle 114. If the audio system discussed herein determines a second velocity of the vehicle 114 using the techniques discussed herein, the second velocity estimate can be used to adjust a confidence level associated with the first velocity. For example, if the first velocity and second velocity are consistent, a confidence level associated with velocity data may increase. A case where the velocities are not within a threshold value may indicate some problem with one or more measurements.

In some examples, determining DoAs over time can increase a certainty that audio data from different DoAs are associated with the same object (e.g., that DoAs are associated with a direct sound or a reflected sound). Other examples are applicable and are not limited to the specific examples discussed herein. Further, though depicted in FIG. 3 for illustrative purposes as performed by a stationary vehicle 102, the invention is not meant to be so limited. The techniques described above may be performed by a moving vehicle 102, adjusting relative positions and geometries accordingly.

Figure 4:
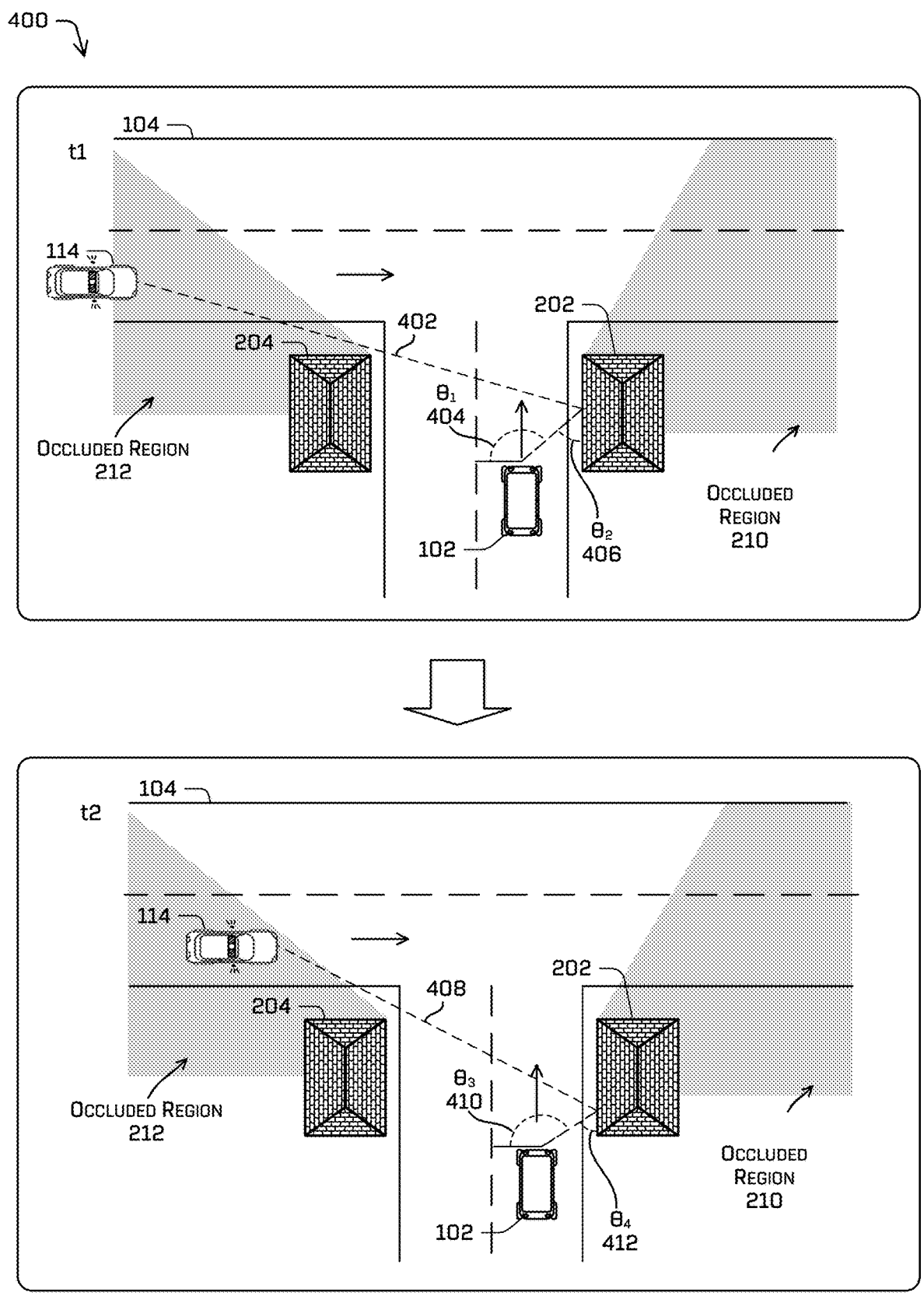
FIG. 4 is a pictorial diagram illustrating an example implementation to determine characteristics of sound originating from an occluded region, the characteristics determined over time, in accordance with examples of the disclosure.

FIG. 4 is a pictorial diagram 400 illustrating an example implementation to determine characteristics of sound originating from an occluded region, the characteristics determined over time, in accordance with examples of the disclosure.

As illustrated in FIG. 4, the vehicle 102 may receive sounds from a variety of sources at different times (e.g., times $t_1$ and $t_2$), and can generate, capture, or otherwise determine audio data to be processed. The time $t_2$ may be a subsequent time relative to the time $t_1$. At the time $t_1$, the emergency vehicle 114 is at a location prior to reaching a location as described above in connection with FIG. 2 (e.g., the emergency vehicle 114 may be further away from a center of the road intersection 104). The vehicle 102 may receive sound 402 by a pair of audio sensors of the vehicle 102 in a similar way as for sound 206, as described above in connection with FIG. 2. The pair of audio sensors by which the vehicle 102 receives the sound 402 can correspond to the same or different audio sensors used to receive the sound 206.

The computing device can determine a DoA 404 associated with the sound 402 according to the techniques discussed herein. The computing device may determine an angle of reflection 406 of the sound 402 based on the DoA 404, a location of the vehicle 102, map data, and/or perception data.

The computing device may determine a geometry of the environment of the vehicle 102 at the time $t_1$ based on the map data and/or the perception data. The location of the emergency vehicle 114 at the time $t_1$ may be determined based on the geometry associated with the environment at the time $t_1$, as well as the DoA 404 and the angle of reflection 406.

At the time $t_2$, a location of the emergency vehicle 114 may be different in comparison to the location of the emergency vehicle 114 at the time $t_1$. The emergency vehicle 114 may be at the location subsequent to reaching or passing the location as described above in connection with FIG. 2 (e.g., the emergency vehicle 114 may be closer to a center of the road intersection 104). The vehicle 102 may receive sound 408. The computing device may capture audio data associated with the sound 408 by a pair of audio sensors of the vehicle 102.

The computing device may determine the sound 408 with which the audio data is associated as having been received by the vehicle 102 as a reflected audio signal, based on the map data and/or perception data. For example, the sound 408 may be determined as having been generated by the emergency vehicle 114 by tracing or otherwise tracking the sound 408 via the DoA 410 and an angle of reflection 412 associated with the sound 408. The angle of reflection can be determined based on the techniques discussed herein.

The computing device may determine an angular difference between the DoA value 404 with which the sound 402 is associated at the time $t_1$ and the DoA value 410 with which the sound 408 is associated at the time $t_2$. The angular difference may be determined by subtracting the DoA value 404 from the DoA value 410.

The computing device may determine a geometry of the environment of the vehicle 102 at the time $t_2$ based on the sound 408 associated with the DoA value 410. The geometry of the associated with the environment at the time $t_1$ may be further determined based on geometry data, the geometry data including at least one of the DoA value 404, the DoA value 410, the angle of reflection 406, the angle of reflection 412, or the angular difference between the DoA value 404 and the DoA value 410. The location of the emergency vehicle at the time $t_2$ may be determined based on at least one of the geometry associated with the environment at the time $t_1$ or the geometry associated with the environment at the time $t_2$.

In at least some examples, map data may also be used to determine locations of drivable surfaces to provide constraints on the velocity of the emergency vehicle determined. As the emergency vehicle 114 may be positioned anywhere along the ray associated with sound 402 at the first time and anywhere along the ray associated with sound 408 at the second time, a minimum and/or maximum velocity may be constrained based at least in part on the regions of drivable surfaces from the map. Further, at the very least, the techniques described herein may provide an indication of a general direction of travel and origin of the emergency vehicle 114 such that vehicle 102 may perform one or more maneuvers so as to allow sufficient space for the emergency vehicle 114.

The computing device may compare the audio data associated with the sound 402 and the audio data associated with the sound 408. A distance (or a distance range or estimate) between the location of the emergency vehicle 114 at the time $t_1$ and the location of the emergency vehicle 114 at the time $t_2$ may be determined based on the geometry associated with the environment at the time $t_1$ and the geometry associated with the environment at the time $t_2$. The distance may be determined notwithstanding the emergency vehicle 114 being partially or completely in the occluded region 212 at the time $t_1$ and/or the time $t_2$. A velocity of the emergency vehicle 114 may be determined based on the distance between the location of the emergency vehicle at the time $t_1$ and the location of the emergency vehicle at the time $t_2$. For example, the velocity may be determined by dividing the distance by the time difference between the time $t_1$ and the time $t_2$.

Figure 5:
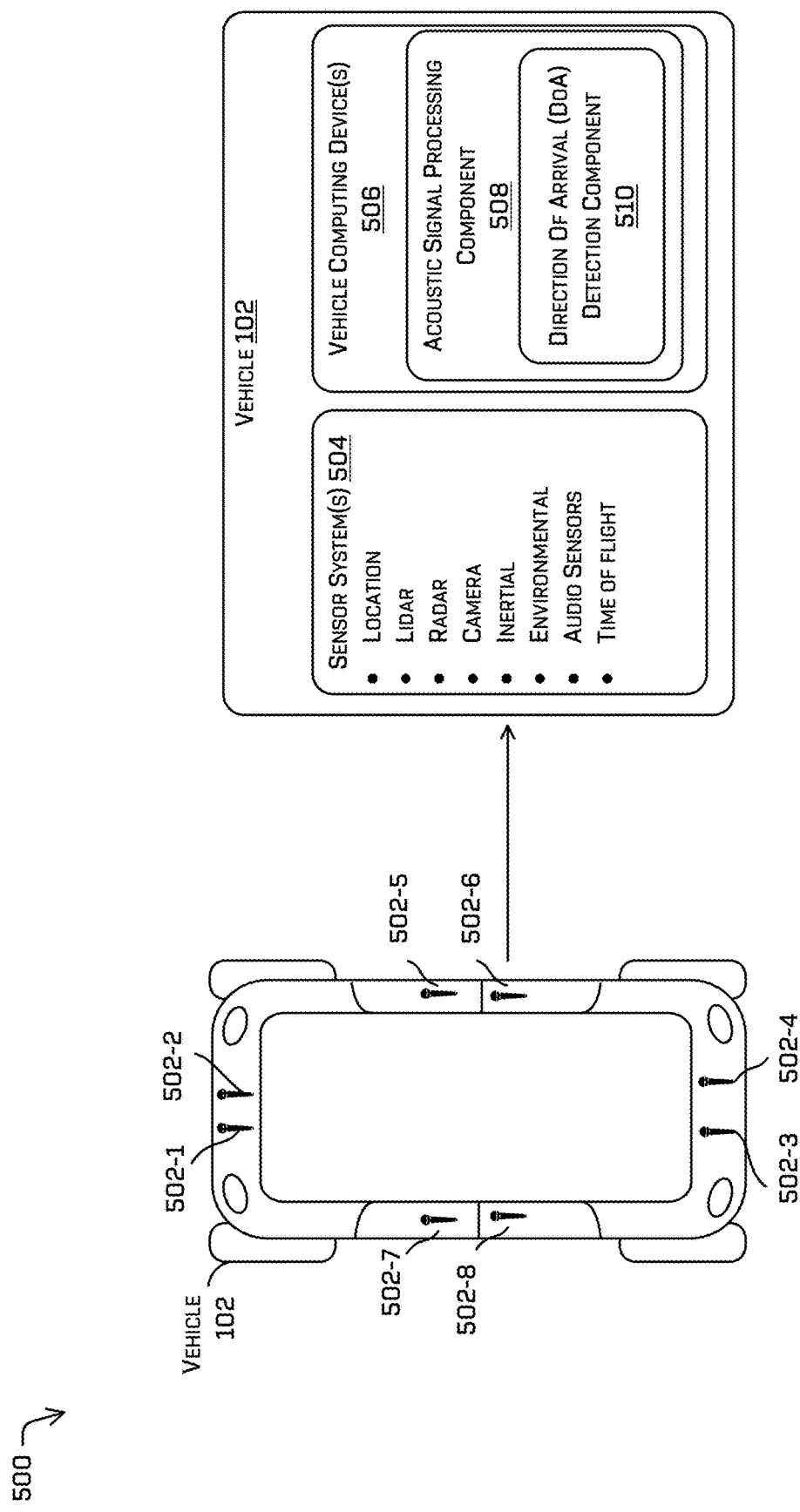
FIG. 5 depicts an example implementation to detect a source of a sound in an environment where vehicle is located, in accordance with examples of the disclosure.

FIG. 5 depicts an example implementation 500 to detect a source of sound in an environment where vehicle is located, in accordance with examples of the disclosure.

As illustrated in FIG. 5, the vehicle 102 may include one or more audio sensors (e.g., 502-1, 502-2, 502-3, 502-4, 502-5, 502-6, 502-7, and 502-8) that generate audio data representing sound in an environment where the vehicle 102 is located.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described below.

In at least one example, the vehicle can be associated with sensor system(s) 504 that can be disposed on the vehicle 102. The sensor system(s) 504 can include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, audio sensors (e.g., audio sensors 502-1, 502-2, 502-3, 502-4, 502-5, 502-6, 502-7, and 502-8), environment sensors (e.g., temperature sensors, humidity sensors, light sensors, pressure sensors, etc.), etc. The sensor system(s) 504 can generate sensor data, which can be utilized by vehicle computing device(s) 506 associated with the vehicle 102.

In at least one example, the vehicle computing device(s) 506 may determine a direction of arrival (DoA) of an audio source in the environment based at least in part on audio data received from the sensor system(s) 504 associated with the vehicle 102. The audio data, i.e., the raw audio data, from the audio source(s) in the environment of the vehicle 102 may be collected, captured, received, or otherwise determined by the audio sensor(s) 502-1, 502-2, 502-3, 502-4, 502-5, 502-6, 502-7, and 502-8. The raw audio data or the raw data may refer to audio data or data captured by the audio sensors that may be uncompressed. Alternatively, the raw audio data and the raw data may refer to audio data or data captured by the audio sensors that may be compressed but that otherwise remain unprocessed. As illustrated in FIG. 5, audio sensor pair [502-1, 502-2] are disposed on a front area of the vehicle 102, audio sensor pair [502-3, 502-4] are disposed on a back area of the vehicle 102, audio sensor pair [502-5, 502-6] are disposed on a right side of the vehicle 102, and audio sensor pair [502-7, 502-8] are disposed on a left side of the vehicle 102. The front area, the back area, the left side and the right side are with respect to a direction of driving of the vehicle 102. Each of the audio sensor pairs can cover an area of 180-degree of angle, although audio sensors may be associated with any coverage range. In some examples, the audio sensor pair [502-1, 502-2] can cover the front area of the vehicle 102 in the 180-degree of angle, the audio sensor pair [502-3, 502-4] can cover the back area of the vehicle 102 in the 180-degree of angle, the audio sensor pair [502-5, 502-6] can cover the right side of the vehicle 102 in the 180-degree of angle, and the audio pair [502-7, 502-8] can cover the left side of the vehicle 102 in the 180-degree of angle. Thus, the audio sensors illustrated in FIG. 5 can cover all directions surrounding the vehicle 102, i.e., 360-degree of angle.

It should be understood that the audio sensors in FIG. 5 are for the purpose of illustration. A different number of audio sensors may be disposed on the vehicle. The positions of those audio sensors being disposed on the vehicle may vary. The forming of audio sensor pairs or the forming of a set of audio sensors comprising more than two audio sensors may be determined in accordance with a size and/or the computing capacity of the vehicle computing device(s) 506.

In some examples, the computing device(s) 506 of the vehicle 102 may include an acoustic signal processing component 508 that processes the audio data or audio signal representing the sound in an environment. The acoustic signal processing component 508 may include a DoA detection component 510. The DoA detection component 510 may receive the audio data representing sound from the environment from the audio sensor(s) 502-1, 502-2, 502-3, 502-4, 502-5, 502-6, 502-7, and 502-8. The DoA detection component 510 may select one or more audio sensor pairs from the above-noted four audio sensor pairs. In some examples, the DoA detection component 510 may form one or more additional audio sensor pairs by pairing two audio sensors respectively selected from the above-noted audio sensors 502-1 to 502-8. For example, the DoA detection component 510 may form an additional audio sensor pair [502-1, 502-7], where audio sensor 502-1 and audio sensor 502-7 are respectively selected from audio sensor pair [502-1, 502-2] and audio sensor pair [502-7, 502-8]. The DoA detection component 510 may estimate an angular spectrum of the audio sensor pair based at least in part on the audio data. In some examples, the DoA detection component 510 may use a generalized cross correlation with phase transform (GCC-PHAT) algorithm to estimate the angular spectrum of the audio sensor pair, although other techniques are discussed herein.

In some examples, the DoA detection component 510 may perform the estimation of angular spectrum based at least in part on the assumption that 1) a DoA is represented by a single angle from which an audio signal impinges at the audio sensor pair from an audio source in a far field, 2) the audio signal propagates in free field from the audio source to each audio sensor, and/or 3) a one-to-one mapping exists between a DoA and a time difference of arrival (TDoA). The GCC-PHAT algorithm may compute a value for each DoA associated with the audio data and output the angular spectrum of the audio sensor pair based at least in part on the audio data. It should be understood that the GCC-PHAT algorithm is used for the purpose of illustration. Other algorithms may also be applied to estimate the angular spectrum, for example, cross-power spectrum phase (CPS) algorithm, GCC-PHAT with Fast Fourier Transform (FFT), etc.

The DoA detection component 510 may determine a feature associated with the audio data based at least in part on the angular spectrum. In some examples, the feature may be selected from the angular spectrum of the audio sensor pair itself, peak values of the angular spectrum of the audio sensor pair, TDoA values at the peaks of the angular spectrum, energy values of the audio sensor pairs, etc. In some examples, the DoA detection component 510 may select one or more features from the angular spectrum to provide more accurate DoA estimation. In some other examples, the DoA detection component 510 may determine a feature associated with the audio data based at least in part on the raw audio data. The feature may be selected from the angular spectrum of the audio sensor pair itself, peak values of the angular spectrum of the audio sensor pair, TDoA values at the peaks of the angular spectrum, energy values of the audio sensor pairs, a frequency spectrum, a noise floor, a noise spectrum, a zero crossing, an energy distribution, a cross correlation, a machine learned embedding, etc. The DoA detection component 510 may perform a DoA value determination based at least in part on the one or more features. In some examples, the DoA detection component 510 may determine an occurrence of an emergency (or non-emergency) and a direction associated with the audio event relative to the vehicle in the environment based at least in part on the one or more features and the DoA value.

In some examples, the DoA detection component 510 may input the audio data into a machine learned model, such as a neural network, to generate the DoA value. An internal buffer space may be set to stream the audio data for processing. Audio data received by the audio sensor(s) may be input into the buffer space (e.g., in a first-in first-out (FIFO) order) whereby audio data can be associated with audio frames. For example, the internal buffer space may correspond to 3 seconds of audio data and an audio frame may correspond to 30 milliseconds of data, although any time periods can be used. For each audio frame, the DoA detection component 510 may perform angular spectrum estimation for the audio sensor pairs based at least in part on the data contained in the audio frame, feature determination based at least in part on the angular spectrum, and/or feature fusion to generate the DoA value associated with the audio frame.

In some examples, a category of the emergency (or non-emergency) may be determined based at least in part from the DoA value and an audio event classifier. The audio event classifier may be a pre-trained component to determine categories of events. The training of the audio event classifier may be based at least in part on historical data associated with past events which occurred in the environment of the vehicle and features/parameters that were used to identify the past events. The features/parameters that were used to identify the past events may be determined based at least in part on the audio data, video data, lidar data, radar data, etc. captured by the vehicle. For emergency vehicles, the audio event classifier may be trained using past emergency vehicles and features that were used to identify those past emergency vehicles and associated with audio data (or other data) representing the siren of the emergency vehicles. The audio event classifier may be periodically trained using the feedback from identified emergencies in real-time.

In some examples, the classification of the audio event may include an emergency audio event class comprising an ambulance siren class, a police siren class, a fire truck siren class, etc., or anon-emergency audio event class comprising an engine sound class, a music sound class, a thundering sound class, a speech sound class, etc.

In some examples, based on the collected audio data representing various types of sounds in the environment, the DoA detection component 510 may determine multiple events. To eliminate ambiguities, so that the vehicle can respond quickly and accurately to the sirens, the DoA detection component 510 may further analyze the multiple events according to preset rules. The sirens of an emergency vehicle in general have dominant sound levels relative to all other sounds in the environment. The emergency vehicle may alert other vehicles and/or objects (e.g., pedestrians, animals, etc.) in the environment by sounding sirens, and the length of the siren may be preset to above a threshold value such that the other vehicles can be alerted. A short siren, i.e., the length of the siren below the threshold value may be missed by the other vehicles or may cause confusion. To avoid confusion caused by such potential false sirens, if an event is detected based on the audio data but a count of the audio frames associated with the event is less than the threshold value, the event may be determined as a non-event. When the audio data is determined to correspond to a non-event, the audio frames associated with the non-event may be removed from further processing to determine the direction of arrival.

In some examples, although the emergency vehicle may have to continuously sound the sirens until a destination is reached, sometimes miles away, some intermittent silences between sounds may occur. In some examples, if a count of the audio frames between two adjacent events is less than a minimum frame gap (which may be pre-defined for the siren signals), the potential silent frames (which may be referred to as an audio frame gap) may be removed, and the adjacent events may be merged.

In some examples, the DoA detection component 510 may determine an emergency vehicle by integrating the audio data with detection of flashing lights associated with the emergency vehicle (such as the vehicle 114 of FIG. 1) or sensor data from other perception systems. The sensor data from other perception systems may comprise data captured by one or more of a lidar sensor, a radar sensor, an image sensor, a time of flight sensor, a sonar sensor, and the like. It should be understood that other perception pipelines may be also integrated with the audio data to determine the occurrence of the emergency vehicle. In one example, image data can be captured, and an emergency vehicle can be detected in the image data.

In some examples, the DoA detection component 510 can be calibrated by or can be based at least in part on perception data. For example, a DoA value can be determined for a sound and can be associated with a source of sound (e.g., an object) via a perception system, for example. If a confidence level of the sound/object association meets or exceeds a threshold value, the sound/object association can be used to calibrate the DoA detection component 510. Further, the DoA detection component 510 can be calibrated or otherwise adjusted based on extrinsic factors such as sensor location, scatter models, and the like, to map the DoA values to perception data or map data.

Figure 6:
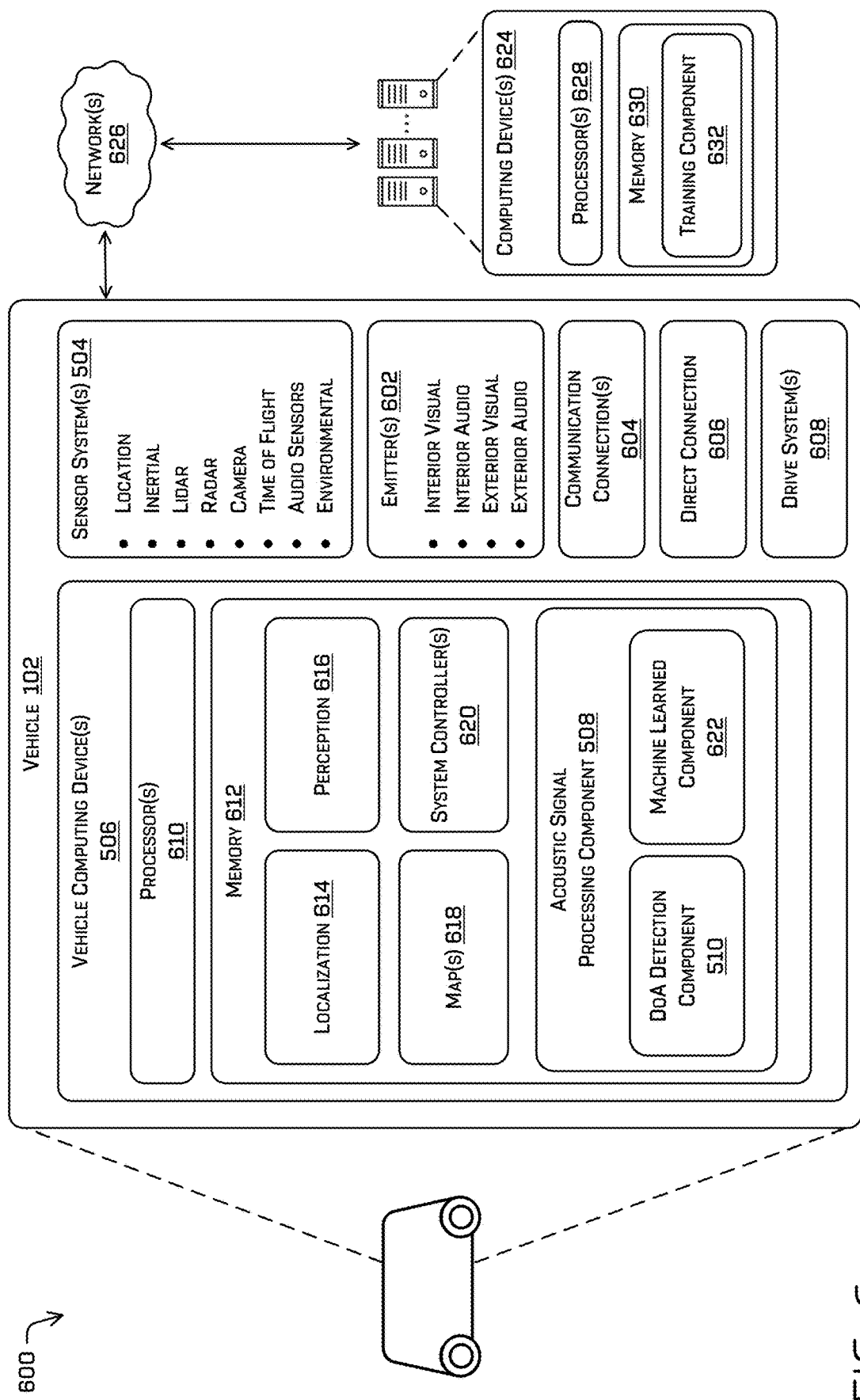
FIG. 6 depicts a block diagram of an example system for implementing the techniques described herein.

FIG. 6 depicts a block diagram of an example system 600 for implementing the techniques described herein.

The vehicle 102 may include one or more vehicle computing devices 506 (also referred to as a vehicle computing device 506 or vehicle computing device(s) 506), one or more sensor systems 504, one or more emitters 602, one or more communication connections 604, at least one direct connection 606, and one or more drive systems 608.

The vehicle computing device 506 may include one or more processors 610 and memory 612 communicatively coupled with the one or more processors 610. In the illustrated example, the vehicle 102 is an autonomous vehicle; however, the vehicle 102 could be any other type of vehicle. In the illustrated example, the memory 612 of the vehicle computing device 506 stores a localization component 614, a perception component 616, one or more maps 618, one or more system controllers 620, an acoustic signal processing component 508 comprising at least a DoA detection component 510 and a machine learned component 622. Though depicted in FIG. 6 as residing in memory 612 for illustrative purposes, it is contemplated that the localization component 614, the perception component 616, the one or more maps 618, the one or more system controllers 620, the acoustic signal processing component 508, the DoA detection component 510, and a machine learned component 622 may additionally, or alternatively, be accessible to the vehicle 102 (e.g., stored remotely).

In at least one example, the localization component 614 may include functionality to receive data from the sensor system(s) 504 to determine a position and/or orientation of the vehicle 102 (e.g., one or more of an x-, y-, z-position, roll, pitch, or yaw). For example, the localization component 614 may include and/or request/receive a map of an environment and may continuously determine a location and/or orientation of the autonomous vehicle within the map. In some instances, the localization component 614 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 614 may provide data to various components of the vehicle 102 to determine an initial position of an autonomous vehicle for generating a trajectory and/or for generating or receiving map data, as discussed herein.

In some instances, the perception component 616 may include functionality to perform object detection, segmentation, and/or classification. In some examples, the perception component 616 may provide processed sensor data that indicates a presence of an entity that is proximate to the vehicle 102 and/or a classification of the entity as an entity type (e.g., car, pedestrian, cyclist, animal, building, tree, road surface, curb, sidewalk, unknown, etc.). In additional or alternative examples, the perception component 616 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 612 may further include one or more maps 618 that may be used by the vehicle 102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 618 may include at least one map (e.g., images and/or a mesh). In some examples, the vehicle 102 may be controlled based at least in part on the map(s) 618. In some examples, the one or more maps 618 may be stored on a remote computing device(s) (such as the computing device(s) 624) accessible via network(s) 626. In some examples, multiple maps 618 may be stored based on, for example, a characteristic (e.g., type of entity, time of day, day of week, season of the year, etc.). Storing multiple maps 618 may have similar memory requirements but increase the speed at which data in a map may be accessed.

In at least one example, the vehicle computing device 506 may include one or more system controllers 620, which may be configured to control steering, propulsion, braking, safety, emitters, communication, and other systems of the vehicle 102. These system controller(s) 620 may communicate with and/or control corresponding systems of the drive system(s) 608 and/or other components of the vehicle 102.

In some examples, the acoustic signal processing component 508 may process the audio data received by a plurality of audio sensors associated with the vehicle 102 and determine an occurrence of an emergency and a direction of the emergency relative to the vehicle based at least in part on the audio data. Such an acoustic signal processing component 508 may comprise a DoA detection component 510. The DoA detection component 510 may receive the audio data collected by the audio sensor(s) in the sensor system(s) 504. to determine a direction of arrival given various pairs of sensor data as described herein.

In some examples, the acoustic signal processing component 508 may further comprise a machine learned component 622 (also referred to as a machine learned model component 622), which may include functionality to receive one or more features associated with the audio data from the DoA detection component 510 (and/or from any one or more sensors) and to generate the DoA value, as discussed herein.

In some instances, aspects of some or all of the components discussed herein may include any models, algorithms, and/or machine learning algorithms. For example, in some instances, the components in the memory 612 (and the memory 630, discussed below) may be implemented as a neural network.

As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 504 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 504 may include multiple instances of each of these or other types of sensors. For instance, the lidar sensors may include individual lidar sensors located at the corners, front, back, sides, and/or top of the vehicle 102. As another example, the camera sensors may include multiple cameras disposed at various locations about the exterior and/or interior of the vehicle 102. The sensor system(s) 504 may provide input to the vehicle computing device 506. Additionally, or alternatively, the sensor system(s) 504 may send sensor data, via the one or more networks 626, to the one or more computing device(s) at a particular frequency, after a lapse of a predetermined period of time, in near real-time, etc.

The vehicle 102 may also include one or more emitters 602 for emitting light and/or sound, as described above. The emitters 602 in this example include interior audio and visual emitters to communicate with passengers of the vehicle 102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 602 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 102 may also include one or more communication connection(s) 604 that enable communication between the vehicle 102 and one or more other local or remote computing device(s). For instance, the communication connection(s) 604 may facilitate communication with other local computing device(s) on the vehicle 102 and/or the drive system(s) 608. Also, the communication connection(s) 604 may allow the vehicle to communicate with other nearby computing device(s) (e.g., other nearby vehicles, traffic signals, etc.). The communications connection(s) 604 also enable the vehicle 102 to communicate with a remote teleoperation computing device or other remote services.

The communications connection(s) 604 may include physical and/or logical interfaces for connecting the vehicle computing device 506 to another computing device or a network, such as network(s) 626. For example, the communications connection(s) 604 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 102 may include one or more drive systems 608. In some examples, the vehicle 102 may have a single drive system 608. In at least one example, if the vehicle 102 has multiple drive systems 608, individual drive systems 608 may be positioned on opposite ends of the vehicle 102 (e.g., the front and the rear, etc.). In at least one example, the drive system(s) 608 may include one or more sensor systems to detect conditions of the drive system(s) 608 and/or the surroundings of the vehicle 102. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 608. In some cases, the sensor system(s) on the drive system(s) 608 may overlap or supplement corresponding systems of the vehicle 102 (e.g., sensor system(s) 504).

The drive system(s) 608 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 608 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 608. Furthermore, the drive system(s) 608 also include one or more communication connection(s) that enable communication by the respective drive system with one or more other local or remote computing device(s).

In at least one example, the direct connection 606 may provide a physical interface to couple the one or more drive system(s) 608 with the body of the vehicle 102. For example, the direct connection 606 may allow the transfer of energy, fluids, air, data, etc. between the drive system(s) 608 and the vehicle. In some instances, the direct connection 606 may further releasably secure the drive system(s) 608 to the body of the vehicle 102.

In some examples, the vehicle 102 may send sensor data to one or more computing device(s) 624 via the network(s) 626. In some examples, the vehicle 102 may send raw sensor data to the computing device(s) 624. In other examples, the vehicle 102 may send processed sensor data and/or representations of sensor data to the computing device(s) 624. In some examples, the vehicle 102 may send sensor data to the computing device(s) 624 at a particular frequency, after a lapse of a predetermined period of time, in near real-time, etc. In some cases, the vehicle 102 may send sensor data (raw or processed) to the computing device(s) 624 as one or more log files.

The computing device(s) 624 may include processor(s) 628 and a memory 630 storing a training component 632.

In some instances, the training component 632 may include functionality to train a machine learning model to generate the DoA value associated with a detected emergency vehicle. For example, the training component 632 may receive a set of audio data associated with an emergency events, as well as features/parameters associated therewith. In some cases, the set of audio data may represent sounds in an environment for a period of time, such as 5 minutes, 5 hours, 1 day, 1 week, and the like. At least a portion of the set of audio data may be used as an input to train the machine learning model, and at least a portion of the set of audio data may be used as ground truth information for training the machine learning model. As a non-limiting example, a first set (e.g., 3, 4, 5, or more) of a sequence of audio data frames may be input into the machine learned model. A second set of audio data (or feature information associated therefrom—e.g., by extracting an angular spectrum, peaks of the angular spectrum and/or TDoA values at peaks from the angular spectrum, etc.) in the sequence of audio data frames immediately preceding the first set may then be used as ground truth for training the model. Thus, by providing audio data of past detected emergency vehicles in an environment, the DoA detection component may detect an occurrence of emergency vehicles and the orientation of the emergency vehicles efficiently, as discussed herein.

In some examples, the training component 632 may include training data that has been generated by a simulator. For example, simulated training data may represent examples where testing audio sources in an environment, to provide additional training examples.

The processor(s) 610 of the vehicle 102 and the processor(s) 628 of the computing device(s) 624 may be any suitable processor capable of executing instructions to process data and perform operations as described herein. By way of example and not limitation, the processor(s) 610 and 628 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 612 and 630 are examples of non-transitory computer-readable media. The memory 612 and 630 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 612 and 630 may include at least a working memory and a storage memory. For example, the working memory may be a high-speed memory of limited capacity (e.g., cache memory) that is used for storing data to be operated on by the processor(s) 610 and 628. In some instances, the memory 612 and 630 may include a storage memory that may be a lower-speed memory of relatively large capacity that is used for long-term storage of data. In some cases, the processor(s) 610 and 628 may not operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 102 may be associated with the computing device(s) 624 and/or components of the computing device(s) 624 may be associated with the vehicle 102. That is, the vehicle 102 may perform one or more of the functions associated with the computing device(s) 624, and vice versa.

Figure 7:
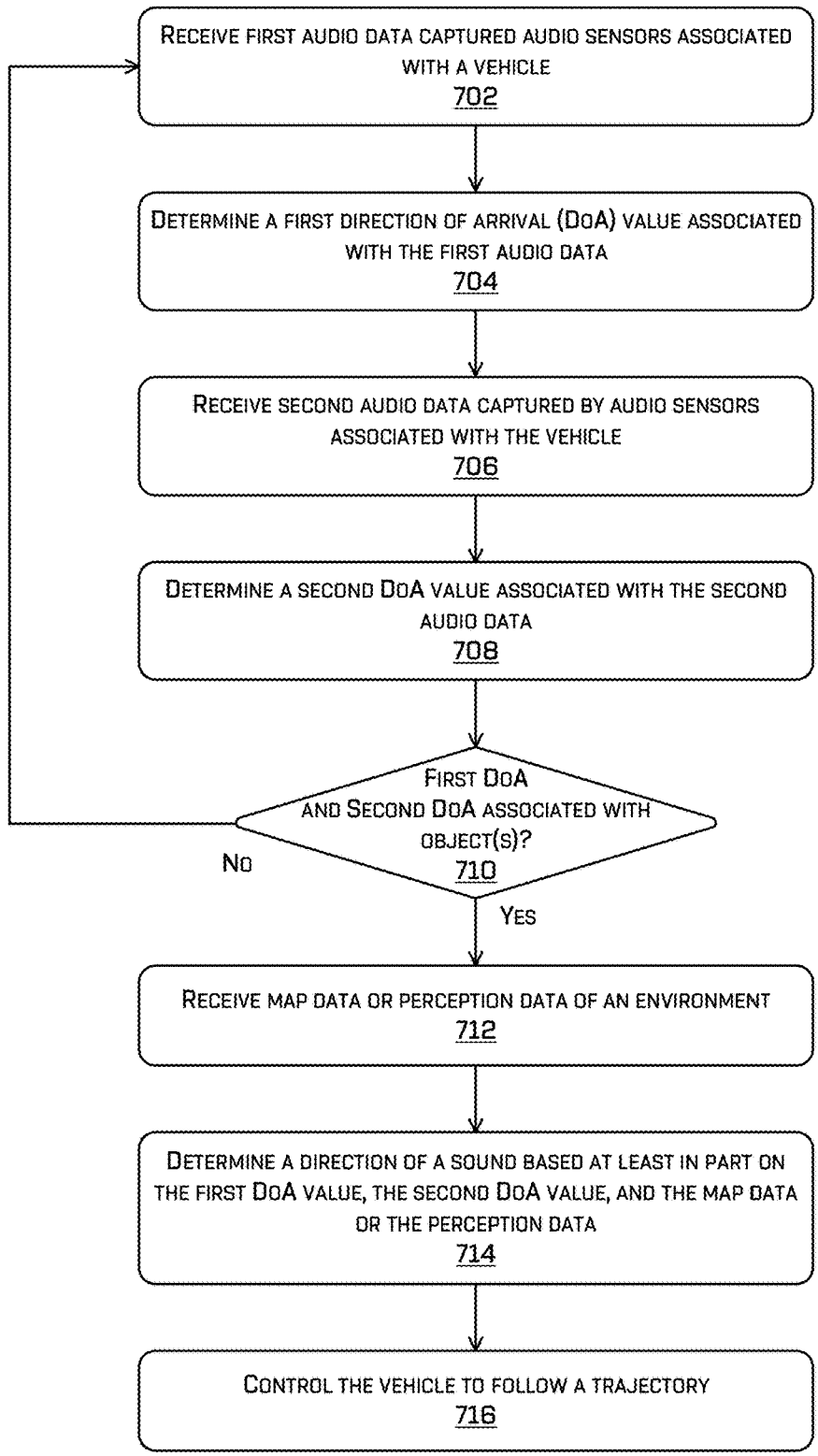
FIG. 7 depicts an example process for disambiguating between direct and reflected sounds in an environment, in accordance with examples of the disclosure.
Figure 8:
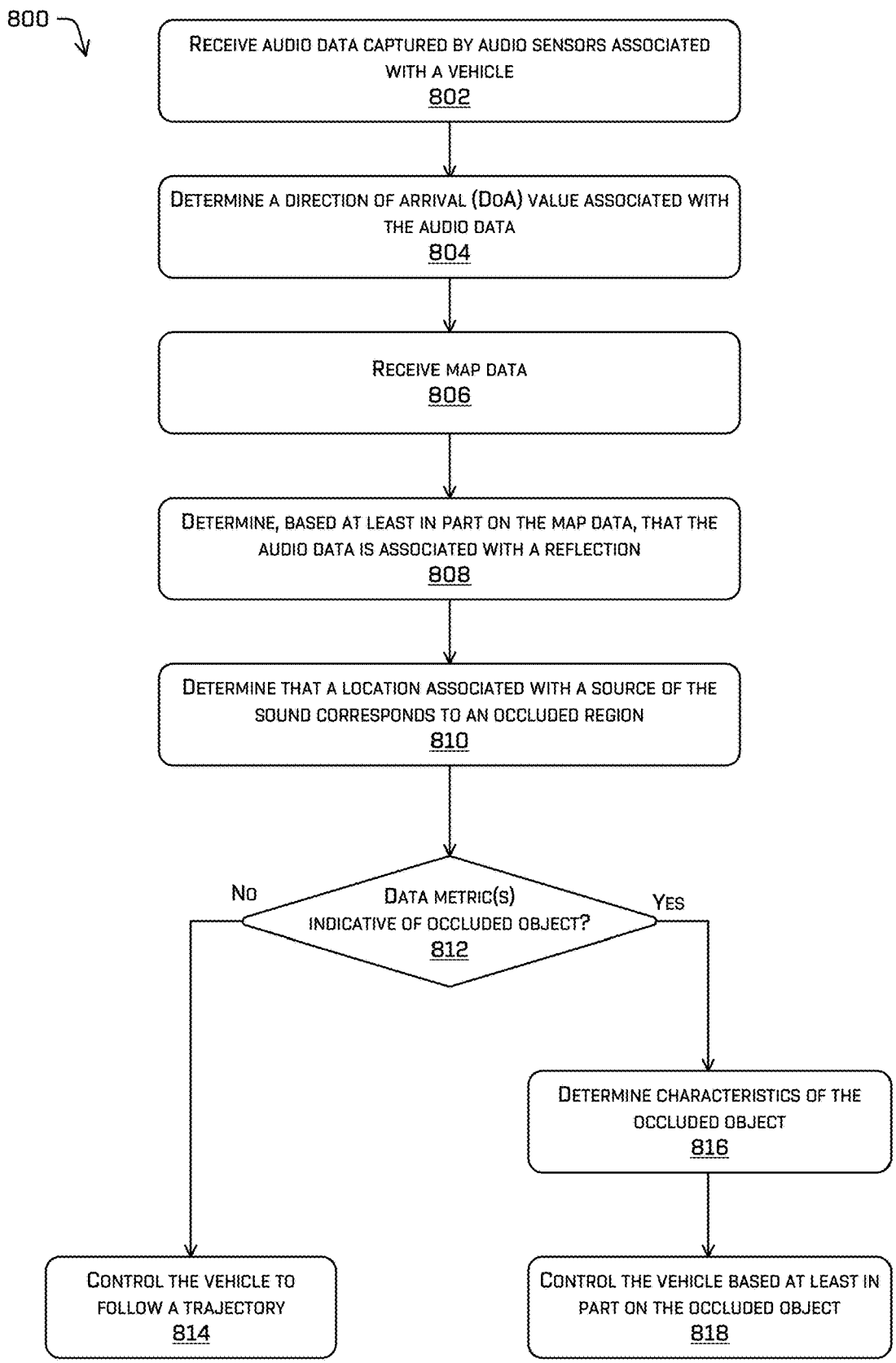
FIG. 8 depicts an example process for determining characteristics for audio data associated with a source of sound located in an occluded region, in accordance with examples of the disclosure.

FIGS. 7 and 8 illustrates example processes in accordance with examples of the disclosure. These processes are illustrated logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 7 depicts an example process 700 for disambiguating between direct and reflected sounds in an environment, in accordance with examples of the disclosure. For example, some or all of the process 700 can be performed by one or more components in FIG. 6, as described herein. For example, some or all of the process 700 may be performed by the acoustic signal processing component 508.

At operation 702, the process may include receiving first audio data captured by audio sensors associated with a vehicle 102. In some examples, the operation 702 may include capturing first audio data associated with sound 112 by a first pair of audio sensors of the vehicle 102. The sound 112 can be associated with a first object (e.g., an emergency vehicle 114).

At operation 704, the process may include determining a first DoA value 122 associated with the first audio data. In some examples, the operation 704 may include determining at least one of an angular spectrum and/or an amplitude associated with the first audio data. The first DoA value 122 associated with the first audio data may be determined based on the angular spectrum and/or the amplitude associated with the first audio data.

At operation 706, the process may include receiving second audio data captured by audio sensors associated with the vehicle 102. In some examples, the operation 706 may include capturing first audio data associated with sound 116 by a second pair of audio sensors of the vehicle 102. The sound 116 can be associated with a second object (e.g., a building 106).

At operation 708, the process may include determining a second DoA value 124 associated with the second audio data. In some examples, the operation 708 may include determining at least one of an angular spectrum and/or an amplitude associated with the second audio data. The second DoA value 124 associated with the second audio data may be determined based on the angular spectrum and/or the amplitude associated with the second audio data.

At operation 710, the process may include determining that the first DoA value 122 and the second DoA value 124 are associated with at least one object. In some examples, the operation 710 may include classifying a first category of a first audio event associated with the first audio data, based on the first DoA value 122 and an audio event classifier. For example, the operation 710 may include classifying a second category of a second audio event associated with the second audio data, based on the second DoA value 124 and the audio event classifier. The first category may be classified as an emergency event or a non-emergency event associated with the first object. The second category may be classified as an emergency event or a non-emergency event associated with the second object. The first DoA value 122 may be associated with the first object based on the first category. The second DoA value 124 may be associated with the second object based on the first category. The operation 710 may be followed by the operation 702 if the first DoA value 122 is determined not to be associated with the first object, if the second DoA value 124 is determined not to be associated with the second object, or if the first DoA value 122 and/or the second DoA value 124 is determined not to be associated with any object (e.g., "no" in the operation 710). The operation 710 may continue to operation 712 if the first DoA value 122 is determined to be associated with the first object and the second DoA value 124 is determined to be associated with the second object (e.g., "yes" in the operation 710).

At operation 712, the process may include receiving map data or perception data of the environment. The map data may include a three-dimensional map of an environment and to continuously determine a location of the vehicle within the map. In some instances, a DoA detection component (e.g., DoA detection component 510 of FIG. 6) may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof. The perception data may include image data or lidar data to detect an object, such as a pedestrian, as well as a bounding box associated with the object (e.g., two-dimensional or three-dimensional bounding box), segmentation information, classification information, pose (e.g., orientation), velocity information, extent (e.g., length, width, and/or height), and the like.

At operation 714, the process may include determining a direction of a sound based at least in part on the first DoA value 122, the second DoA value 124, and the map data or the perception data. In some examples, the operation 714 may include determining the sound 116 with which the audio data is associated as having been received by the vehicle 102 as reflected sound, based on the map data and/or perception data. The second audio data with which the second DoA value 124 is associated may be eliminated based on the second DoA value 124 being associated with the location of the building 106. The direction of the emergency vehicle 114 may be determined based on the second audio data being eliminated, and further based on third audio data received from a third object (e.g., construction zone 110) being eliminated. The first DoA value 122 may be determined to be associated with a location of the emergency vehicle 114, and not with a location of the building 106 or a location of the construction zone 110. The location of the emergency vehicle 114 may be determined based on the map data and/or the perception data, and/or at least one of the first DoA value 122, the second DoA value 124, or a third DoA value 126 associated with the third audio data.

At operation 716, the process may include controlling the vehicle 102 based on the location of the emergency vehicle 114. In some examples, the operation 716 may include determining a trajectory of the vehicle 114 based on the location of the emergency vehicle 114. The vehicle 102 may be controlled to move according to (e.g., follow) the trajectory.

FIG. 8 depicts an example process 800 for determining characteristics for audio data associated with a source of sound located in an occluded region, in accordance with examples of the disclosure. For example, some or all of the process 800 can be performed by one or more components in FIG. 6, as described herein. For example, some or all of the process 800 may be performed by the acoustic signal processing component 508.

At operation 802, the process may include receiving audio data captured by audio sensors associated with the vehicle 102. In some examples, the operation 802 may include capturing audio data associated with sound 402 by a pair of audio sensors of the vehicle 102. The sound 402 may represent a sound generated by or associated with a first object (e.g., emergency vehicle 114) but has been reflected by a second object (e.g., building 202) in the environment.

At operation 804, the process may include determining a DoA value 208 associated with the audio data. In some examples, the operation 804 may include determining at least one of an angular spectrum and/or an amplitude associated with the audio data. A DoA value 404 associated with the audio data may be determined based on the angular spectrum and/or the amplitude associated with the audio data.

At operation 806, the process may include receiving map data. In some examples, the operation 806 may include receiving map data that includes a three-dimensional map of an environment and continuously determining a location of the vehicle within the map. In some instances, a DoA detection component (e.g., DoA detection component 510 of FIG. 5) may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof. The emergency vehicle 114 and the building 106 may be classified based on the map data and an objects classifier. For example, the objects classifier may classify the emergency vehicle 114 as an emergency object and the building 106 as a non-emergency object, based on the map data.

At operation 808, the process may include determining, based at least in part on the map data, that the audio data is associated with a reflection. In some examples, the operation 808 may include determining at least one of an angular spectrum and/or an amplitude associated with the audio data. A DoA value 404 associated with the audio data may be determined based on the angular spectrum and/or the amplitude associated with the audio data. Locations of objects in the environment of the vehicle 102 may be determined. A location of the building 202, a location of the building 204, and a location of the vehicle 102 may be determined. The audio data may be determined to be associated with a reflection from the building 202 based on the DoA value 404, the location of the building 202, and the location of the vehicle 102.

At operation 810, the process may include determining that a location associated with a source of the sound corresponds to an occluded region. In some examples, the operation 810 may include determining an occluded region 210 based on the location of the building 202 and the location of the vehicle 102, and an occluded region 212 based on the location of the building 204 and the location of the vehicle 102. A location of the emergency vehicle 114 may be determined based on the DoA value 404, the location of the vehicle 102, the location of the building 202, and/or an angle of reflection 406 associated with the audio data. The location associated with the emergency vehicle 114 may be determined to correspond to the occluded region 212 (e.g., a location behind the building 204 and/or a location not in a direct line of site from sensor(s) of the vehicle 102). In some examples, the occluded region 210 may be determined based on the map data and/or the perception data, and further based on a perspective of the sensor(s) of the vehicle 102 as pertaining to the location associated with the building 202. In some examples, the occluded region 212 may be determined based on the map data and/or the perception data, and further based on a perspective of the sensor(s) of the vehicle 102 as pertaining to the location associated with the building 204.

At operation 812, the process may include determining data metric(s) indicative of an occluded object. In some examples, the operation 812 may include determining the data metric(s) indicative of the emergency vehicle 114 being behind the building 204 and/or in the occluded region 212. The data metric(s) may be evaluated with respect to other data metric(s), normalization data (e.g., ambient light, weather, location, temperature, sensor age, time of data, and the like), and/or one or more models and/or thresholds. If the data metric(s) are not indicative of an occluded object (e.g., "no" in the operation 810) the process continues to operation 814.

At operation 814, the process can include controlling the vehicle 102 to follow a trajectory. For example, the operation 814 can include receiving a trajectory from a planning component and controlling an acceleration and/or steering angle of the vehicle to follow the trajectory. In this example, because the data metric is does not indicate a degraded state, the trajectory may be followed as planned without reductions in speed or alterations in steering angles to traverse around obstacles (e.g., giving a wider berth to obstacles in the environment).

Returning to the operation 812, if the data metric(s) are indicative of an occluded object (e.g., "yes" at the operation 812), the process continues to operation 816.

At operation 816, the process can include determining characteristics of the occluded object. For example, the operation 816 can include comparing the audio data associated with the sound 402 at a time $t_1$ to audio data associated with a sound 408 at a time $t_2$. The time $t_2$ may be a subsequent time relative to the time $t_1$. A distance (or distance range or distance estimate) between the location of the emergency vehicle 114 at the time $t_1$ and a location of the emergency vehicle 114 at the time $t_2$ may be determined. The distance may be determined notwithstanding the emergency vehicle 114 being partially or completely in the occluded region 212 at the time $t_1$ and/or the time $t_2$. A velocity of the emergency vehicle 114 may be determined based on the distance between the location of the emergency vehicle at the time $t_1$ and the location of the emergency vehicle at the time $t_2$. For example, the velocity may be determined by dividing the distance by the time difference between the time $t_1$ and the time $t_2$.

At operation 818, the process can include controlling the vehicle 102 to follow a trajectory. For example, the operation 818 can include controlling the vehicle 102 to slow or stop based on determining that an occluded object is an emergency vehicle and is approaching a location associated with the vehicle.

EXAMPLE CLAUSES

A. A system comprising: one or more processors; and one or more non-transitory computer-readable media storing instructions executable by the one or more processors, wherein the instructions, when executed, cause the system to perform operations comprising: receiving first audio data associated with a vehicle in an environment; receiving second audio data associated with the vehicle; determining, based at least in part on the first audio data, a first direction of arrival (DoA) value; determining, based at least in part on the second audio data, a second DoA value; receiving, as environment data, at least one of map data of the environment, image data associated with the environment, lidar data associated with the environment, or radar data associated with the environment; determining, based at least in part on the environment data, the first DoA value, and the second DoA value, that the second audio data is associated with a reflected sound associated with the first audio data; and controlling the vehicle based at least in part on the second audio data being associated with the reflected sound.

B. The system of paragraph A, wherein the first audio data and the second audio data are associated with a same source.

C. The system of paragraph A or B, wherein the first audio data is captured by a first audio sensor and a second audio sensor, and wherein the second audio data is captured by a third audio sensor and a fourth audio sensor.

D: The system of paragraph C, wherein the first audio sensor and the third audio sensor are the same audio sensor, and wherein the second audio sensor and the fourth audio sensor are the same audio sensor.

E. The system of any of paragraphs A-D, the operations further comprising: determining at least one scattering model comprising at least one of a first scattering model associated with the vehicle or a second scattering model associated with an object off of which a sound associated with the second audio data is reflected; and determining that the second audio data is associated with the reflected sound further based at least in part on the at least one scattering model.

F. The system of any of paragraphs A-E, the operations further comprising: determining, based at least in part on the environment data, that the first DoA value is associated with a drivable region; and determining, based at least in part on the first DoA value being associated with the drivable region, that the first audio data is received as at least one of a direct signal or an indirect signal.

G: A method comprising: receiving first audio data associated with a vehicle in an environment; receiving second audio data; determining, based at least in part on the first audio data, a first direction of arrival (DoA) value; determining, based at least in part on the second audio data, a second DoA value; and determining, based at least in part on perception data associated with the environment, the first DoA value, and the second DOA value, a direction of a source of sound relative to the vehicle.

H: The method of paragraph G, further comprising: determining that the first audio data and the second audio data are associated with a same source.

I: The method of paragraph G or H, further comprising: determining, based at least in part on map data or the perception data, that the first DoA is associated with a drivable region; determining, based at least in part on the map data or the perception data, that the second DoA is associated with an object in the environment; and determining, based at least in part on the second DoA, the object, and at least one of the map data or the perception data, that the second audio data is received as reflected sound.

J: The method of any of paragraphs G-I, further comprising: controlling the vehicle based at least in part on the direction associated with the source of the sound.

K: The method of any of paragraphs G-J, wherein the direction is a first direction associated with a first time, the method further comprising: determining, based at least in part on the first direction, the first DoA value, and the second DoA value, at least one of a distance or a velocity associated with the source of the sound.

L: The method of any of paragraphs G-K, further comprising: determining a geometry of the environment based at least in part on at least one of map data of the environment or the perception data associated with the environment.

M: The method of any of paragraphs G-L, further comprising: receiving, as environment data, at least one of map data, image data, lidar data, or radar data; identifying, based at least in part on the environment data, a candidate sound associated with the first audio data and the second audio data; and determining a classification associated with the candidate sound based at least in part on a characteristic of at least one of the first audio data or the second audio data.

N: The method of any of paragraphs G-M, further comprising: identifying a sound associated with the first audio data and the second audio data; and determining a classification associated with the sound based at least in part on at least one of map data or the perception data.

O: One or more non-transitory computer-readable media storing instructions executable by a processor, wherein the instructions, when executed, cause the processor to perform operations comprising: receiving environment data based on at least one of map data, image data, or lidar data; determining, based at least in part on the environment data, region data associated with a candidate sound in an environment; receiving audio data associated with a vehicle in an environment; and determining, based at least in part on the region data and the audio data, a direction of arrival (DoA) value.

P. The one or more non-transitory computer-readable media of paragraph O, wherein the candidate sound is associated with a direct path of sound, the operations further comprising: determining, based at least in part on the environment data, the region data associated with the direct path of sound in the environment.

Q. The one or more non-transitory computer-readable media of paragraph O or P, the operations further comprising: determining, based at least in part on the environment data, that the DoA value is associated with a drivable region; and determining, based at least in part on the DoA value being associated with the drivable region, that the audio data is received as at least one of a direct signal or an indirect signal.

R. The one or more non-transitory computer-readable media of any of paragraphs O-Q, the operations further comprising: determining, based at least in part on the region data and the DOA value, a direction of a source of the candidate sound relative to the vehicle; and controlling the vehicle based at least in part on the direction associated with the source of the candidate sound.

S. The one or more non-transitory computer-readable media of any of paragraphs O-R, wherein the audio data is first audio data, and the DoA value is a first DoA value, the operations further comprising: receiving second audio data; determining, based at least in part on the second audio data, a second DoA value; and determining, based at least in part on the first DoA value and the second DoA value, at least one of a distance or a velocity associated with a source of the candidate sound.

T. The one or more non-transitory computer-readable media of any of paragraphs O-S, the operations further comprising: determining a geometry of the environment based at least in part on at least one of map data or perception data associated with the environment.

U: A system comprising: one or more processors; and one or more computer-readable media storing instructions executable by the one or more processors, wherein the instructions, when executed, cause the system to perform operations comprising: receiving audio data associated with a vehicle in an environment; determining, based at least in part on the audio data, a direction of arrival (DoA) value associated with the audio data; receiving environment data associated with the environment, the environment data comprising at least one of map data, image data, lidar data, or radar data; determining, based at least in part on the DoA value and the map data, an angle of reflection associated with the audio data; and determining, based at least in part on the angle of reflection, that a location associated with a source of sound is associated with an occluded region.

V: The system of paragraph U, the operations further comprising: receiving perception data associated with the environment; and determining, based at least in part on the perception data, that the DoA value is associated with an object in a portion of the environment that is not visible from the vehicle.

W: The system of paragraph U or V, the operations further comprising: determining that the occluded region is associated with a drivable region; and determining a classification associated with the sound based at least in part on the occluded region being associated with the drivable region.

X: The system of any of paragraphs U-W, wherein the audio data is first audio data associated with a first time and the DoA value is a first DoA value associated with the first audio data, the operations further comprising: receiving second audio data at a second time after the first time; determining a second DoA value associated with the second audio data; determining an angular difference between the first DoA value and the second DoA value; and determining, based at least in part on the angular difference and on the map data, a direction of travel associated with the source of the sound.

Y: The system of any of paragraphs U-X, the operations further comprising: determining, based at least in part on the map data, an orientation of a surface associated with the DoA value; and determining, based at least in part on the orientation of the surface, the angle of reflection associated with the audio data.

Z: A method comprising: receiving audio data associated with a vehicle in an environment; determining a direction of arrival (DoA) value associated with the audio data; receiving environment data associated with the environment, the environment data comprising at least one of map data, image data, lidar data, or radar data; determining, based at least in part on the DoA value and the environment data, an angle of reflection associated with the audio data; and determining, based at least in part on the angle of reflection and the environment data, that a location associated with a source of sound is associated with an occluded region.

AA: The method of paragraph Z, further comprising: determining, based at least in part on the environment data, an orientation of a surface associated with the DoA value; and determining, based at least in part on the orientation of the surface, the angle of reflection associated with the audio data.

AB: The method of paragraph Z or AA, further comprising: determining at least one scattering model comprising at least one of a first scattering model or a second scattering model, the first scattering model being associated with the vehicle, the second scattering model being associated with an object off of which an audio signal associated with the audio data is reflected; and determining the location further based at least in part on the at least one scattering model.

AC: The method of any of paragraphs Z-AB, further comprising: determining that the occluded region is associated with at least one of a drivable region or a non-drivable region.

AD: The method of paragraph AC, further comprising: determining a confidence level associated with a classification associated with the sound based at least in part on the occluded region being associated with the at least one of the drivable region or the non-drivable region.

AE: The method of any of paragraphs Z-AD, further comprising: receiving perception data associated with the environment; and increasing a confidence level associated with a likelihood that the source of the sound is associated with an emergency vehicle based at least in part on the perception data indicating that the source of the sound is in a drivable region not visible from the vehicle.

AF: The method of any of paragraphs Z-AE, wherein the audio data is first audio data associated with a first time and the DoA value is a first DoA value, the method comprising: receiving second audio data at a second time after the first time; determining a second DoA value associated with the second audio data; determining an angular difference between the first DoA value and the second DoA value; and determining, based at least in part on the angular difference and on the environment data, a direction of travel associated with the source of the sound.

AG: One or more non-transitory computer-readable media storing instructions executable by a processor, wherein the instructions, when executed, cause the processor to perform operations comprising: receiving audio data from a pair of audio sensors associated with a vehicle in an environment; determining a direction of arrival (DoA) value associated with the audio data; receiving environment data associated with the environment; determining, based at least in part on the DoA value and the environment data, an angle of reflection associated with the audio data; and determining, based at least in part on the angle of reflection and the environment data, that a location associated with a source of sound is associated with an occluded region.

AH. The one or more non-transitory computer-readable media of paragraph AG, the operations further comprising: determining, based at least in part on the environment data, an orientation of a surface associated with the DoA value; and determining, based at least in part on the orientation of the surface, the angle of reflection associated with the audio data.

AI. The one or more non-transitory computer-readable media of paragraph AG or AH, wherein the environment data is based at least in part on at least one of map data, image data, or lidar data.

AJ. The one or more non-transitory computer-readable media of any of paragraphs AG-AI, the operations further comprising: determining that the occluded region is associated with at least one of a drivable region or a non-drivable region.

AK. The one or more non-transitory computer-readable media of paragraph AJ, the operations further comprising: determining a confidence level associated with a classification associated with the sound based at least in part on the occluded region being associated with the at least one of the drivable region or the non-drivable region.

AL. The one or more non-transitory computer-readable media of any of paragraphs AG-AK, the operations further comprising: determining a bound associated with a location of the source of the sound.

AM. The one or more non-transitory computer-readable media of any of paragraphs AG-AL, wherein the audio data is first audio data associated with a first time and the DoA value is a first DoA value, the operations further comprising: receiving second audio data at a second time after the first time; determining a second DoA value associated with the second audio data; determining an angular difference between the first DoA value and the second DoA value; and determining, based at least in part on the angular difference and on the environment data, a direction of travel associated with the source of the sound.

AN. The one or more non-transitory computer-readable media of any of paragraphs AG-AM, wherein the audio data is first audio data associated with a first time and the DoA value is a first DoA value, the operations further comprising: receiving second audio data at a second time after the first time; determining a second DoA value associated with the second audio data; determining an angular difference between the first DoA value and the second DoA value; and determining, based at least in part on the angular difference and on the environment data, a velocity associated with the source of the sound.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
      receiving first audio data associated with an autonomous vehicle in an environment;
      receiving second audio data associated with the autonomous vehicle;
      determining, based at least in part on the first audio data, a first direction of arrival (DoA) value;
      determining, based at least in part on the second audio data, a second DoA value;
      receiving, as environment data, at least one of map data of the environment, image data associated with the environment, lidar data associated with the environment, or radar data associated with the environment;
      determining, based at least in part on the environment data, the first DoA value, and the second DoA value, and on both the first audio data and the second audio data representing sound emitted by an object in the environment, that the first audio data is associated with the sound being emitted by the object, and, based at least in part on the sound being reflected by a surface in the environment, that the second audio data is associated with reflected sound associated with the first audio data; and
      controlling the autonomous vehicle based at least in part on the second audio data being associated with the reflected sound.

2. The system of claim 1, wherein the first audio data and the second audio data are associated with a same source.

3. The system of claim 1, wherein the first audio data is captured by a first audio sensor and a second audio sensor, and
   wherein the second audio data is captured by a third audio sensor and a fourth audio sensor.

4. The system of claim 3, wherein the first audio sensor and the third audio sensor are a same audio sensor, and
   wherein the second audio sensor and the fourth audio sensor are the same audio sensor.

5. The system of claim 1, wherein the object is a first object, the operations further comprising:

determining at least one scattering model comprising at least one of a first scattering model associated with the autonomous vehicle or a second scattering model associated with a second object off of which the sound is reflected; and determining that the second audio data is associated with the reflected sound further based at least in part on the at least one scattering model.

6. The system of claim 1, the operations further comprising:

determining, based at least in part on the environment data, that the first DoA value is associated with a drivable region; and determining, based at least in part on the first DoA value being associated with the drivable region, that the first audio data is received as a direct signal.

7. A method comprising:

receiving first audio data by an autonomous vehicle in an environment;

receiving second audio data;

determining, based at least in part on the first audio data, a first direction of arrival (DoA) value;

determining, based at least in part on the second audio data, a second DoA value; and determining, based at least in part on perception data associated with the environment, the first DoA value, and the second DOA value, and on both the first audio data and the second audio data representing sound emitted by an object in the environment, that the first audio data is associated with the sound being emitted by the object, and, based at least in part on the sound being reflected by a surface in the environment, that the second audio data is associated with reflected sound associated with the first audio data.

8. The method of claim 7, further comprising:

determining that the first audio data and the second audio data are associated with a same source.

9. The method of claim 7, wherein the object is a first object, further comprising:

determining, based at least in part on map data or the perception data, that the first DoA value is associated with a drivable region;

determining, based at least in part on the map data or the perception data, that the second DoA value is associated with a second object in the environment; and determining, based at least in part on the second DoA value, the second object, and at least one of the map data or the perception data, that the second audio data is received as reflected sound.

10. The method of claim 7, further comprising:

determining a direction of a source of the sound relative to the autonomous vehicle; and controlling the autonomous vehicle based at least in part on the direction associated with the source of the sound.

11. The method of claim 7, further comprising:

determining a first direction of a source of the sound relative to the autonomous vehicle; and determining, based at least in part on the first direction, the first DoA value, and the second DoA value, at least one of a distance or a velocity associated with the source of the sound.

12. The method of claim 7, further comprising:

determining a geometry of the environment based at least in part on at least one of map data of the environment or the perception data.

13. The method of claim 7, further comprising:

receiving, as environment data, at least one of map data, image data, lidar data, or radar data;

identifying, based at least in part on the environment data, candidate sound associated with the first audio data and the second audio data; and determining a classification associated with the candidate sound based at least in part on a characteristic of at least one of the first audio data or the second audio data.

14. The method of claim 7, further comprising:

determining a classification associated with the sound based at least in part on at least one of map data or the perception data.

15. One or more non-transitory computer-readable media storing instructions executable by a processor, wherein the instructions, when executed, cause the processor to perform operations comprising:

receiving environment data based on at least one of map data, image data, or lidar data, the environment data being generated based at least in part on sound emitted by an object in an environment;

determining, based at least in part on the environment data, region data associated with candidate sound in the environment;

receiving first audio data by an autonomous vehicle in the environment; and determining, based at least in part on the region data, and on both the first audio data and second audio data representing sound emitted by the object, that the first audio data is associated with the sound being emitted by the object, and, based at least in part on the sound being reflected by a surface in the environment, that the second audio data is associated with reflected sound associated with the first audio data.

16. The one or more non-transitory computer-readable media of claim 15, wherein the candidate sound is associated with a direct path of the sound, the operations further comprising:

determining, based at least in part on the environment data, the region data associated with the direct path of the sound in the environment.

17. The one or more non-transitory computer-readable media of claim 15, the operations further comprising:

determining, based at least in part on the region data, and on both the first audio data and second audio data, a direction of arrival (DoA) value;

determining, based at least in part on the region data and the DoA value, a direction of a source of the candidate sound relative to the autonomous vehicle; and controlling the autonomous vehicle based at least in part on the direction associated with the source of the candidate sound.

18. The one or more non-transitory computer-readable media of claim 15, the operations further comprising:

determining, based at least in part on the region data, and on both the first audio data and second audio data, a first direction of arrival (DoA) value;

receiving the second audio data;

determining, based at least in part on the second audio data, a second DoA value; and determining, based at least in part on the first DoA value and the second DoA value, at least one of a distance or a velocity associated with a source of the candidate sound.

19. The one or more non-transitory computer-readable media of claim 15, the operations further comprising:

determining a geometry of the environment based at least in part on at least one of the map data or perception data associated with the environment.

20. The one or more non-transitory computer-readable media of claim 15, the operations further comprising:
determining a classification associated with the sound based at least in part on at least one of the map data or perception data.

* * * * *